(12) United States Patent
Lock

(10) Patent No.: US 11,629,760 B2
(45) Date of Patent: Apr. 18, 2023

(54) MECHANICAL JOINTS AND APPLICATIONS

(71) Applicant: Angle X, Inc., Huntington Beach, CA (US)

(72) Inventor: Kenneth Anthony Lock, Westminster, CA (US)

(73) Assignee: Angle X, Inc., Huntington Beach, CA (US)

( * ) Notice: Subject to any disclaimer, the term of this patent is extended or adjusted under 35 U.S.C. 154(b) by 260 days.

(21) Appl. No.: 17/062,447

(22) Filed: Oct. 2, 2020

(65) Prior Publication Data

US 2021/0102582 A1    Apr. 8, 2021

Related U.S. Application Data

(60) Provisional application No. 62/910,750, filed on Oct. 4, 2019.

(51) Int. Cl.
*F16D 3/24*    (2006.01)
*B63H 5/00*    (2006.01)
*B63H 20/00*    (2006.01)

(52) U.S. Cl.
CPC ............ *F16D 3/24* (2013.01); *B63H 5/00* (2013.01); *B63H 20/00* (2013.01)

(58) Field of Classification Search
CPC ............. F16D 3/24; B63H 5/00; B63H 20/00
See application file for complete search history.

(56) References Cited

U.S. PATENT DOCUMENTS

| | | | |
|---|---|---|---|
| 243,914 A | | 7/1881 | Johnston |
| 899,913 A | * | 9/1908 | Shaw |
| 919,651 A | | 4/1909 | Spicer |
| 956,912 A | * | 5/1910 | Walters |
| 1,101,996 A | | 6/1914 | Carter et al. |
| 1,222,268 A | | 4/1917 | Douglass |
| 1,368,607 A | | 2/1921 | Cooper |
| 1,457,219 A | | 5/1923 | Dusseau |
| 2,104,101 A | | 1/1938 | Rosenbaum |
| 2,305,594 A | | 12/1942 | Backus |
| 2,921,451 A | | 1/1960 | Helmke |

(Continued)

FOREIGN PATENT DOCUMENTS

| | | |
|---|---|---|
| CN | 2487516 Y | 4/2002 |
| CN | 202780975 U | 3/2013 |

(Continued)

OTHER PUBLICATIONS

Office Action in JP Application No. 2020-503251 dated Nov. 29, 2021 in 9 pages.

(Continued)

*Primary Examiner* — Stephen P Avila
(74) *Attorney, Agent, or Firm* — Knobbe Martens Olson & Bear, LLP

(57) ABSTRACT

A mechanical joint for transferring rotational motion between shafts at an angle and related assemblies. The assemblies can include both fixed and adjustable-angle joint housings for providing high torques in hard to reach areas. Other assemblies include improvements in inboard marine drives that correct the prop angle to generally align with the direction of travel of the boat and outboard marine drives with improved drive trains.

24 Claims, 28 Drawing Sheets

(56) References Cited

U.S. PATENT DOCUMENTS

| | | | |
|---|---|---|---|
| 3,059,948 A | | 10/1962 | Thompson et al. |
| 3,107,505 A | | 10/1963 | Koss |
| 3,469,416 A | | 9/1969 | Snyder |
| 3,609,994 A | | 10/1971 | Colletti et al. |
| 4,003,218 A | | 1/1977 | Fildeman |
| 4,088,091 A | * | 5/1978 | Smith .............. B63H 5/16 440/69 |
| 4,114,401 A | | 9/1978 | Van Hoose |
| 4,352,276 A | | 10/1982 | Smith |
| 4,460,058 A | | 7/1984 | Welschof et al. |
| 4,509,932 A | | 4/1985 | Weibe |
| 4,560,368 A | | 12/1985 | Sherman, II et al. |
| 4,645,463 A | * | 2/1987 | Arneson ............ B63H 5/125 440/57 |
| 4,981,452 A | * | 1/1991 | Grinde ............... F01N 13/12 440/53 |
| 5,167,548 A | * | 12/1992 | Thiger ............. B63H 5/1252 440/58 |
| 5,221,233 A | | 6/1993 | Jacob |
| 5,288,271 A | | 2/1994 | Nelson et al. |
| 5,292,285 A | | 9/1994 | Ingalsbe et al. |
| 5,383,802 A | * | 1/1995 | Nicholson .......... B63H 11/08 440/38 |
| 5,409,332 A | | 4/1995 | Chabot, Jr. et al. |
| 5,586,939 A | | 12/1996 | Swinney |
| 5,613,914 A | | 3/1997 | Gleasman et al. |
| 5,618,234 A | | 4/1997 | Carden |
| 5,647,801 A | | 7/1997 | Jacob |
| 5,816,926 A | | 10/1998 | Lynch et al. |
| 6,139,437 A | | 10/2000 | Thompson |
| 6,913,540 B2 | | 7/2005 | Iihara et al. |
| 7,165,890 B2 | | 1/2007 | Smith |
| 7,604,412 B2 | | 10/2009 | Smith |
| 7,632,188 B2 | | 12/2009 | Gleasman et al. |
| 7,993,207 B2 | | 8/2011 | Arden et al. |
| 8,001,873 B2 | | 8/2011 | Peng |
| 8,246,476 B2 | | 8/2012 | Chen |
| 10,132,360 B2 | | 11/2018 | Lock |
| 11,111,964 B2 | | 9/2021 | Lock |
| 2005/0124422 A1 | | 6/2005 | Mondragon-Parra et al. |
| 2006/0128478 A1 | | 6/2006 | Carden |
| 2006/0141251 A1 | | 6/2006 | Sundermann et al. |
| 2008/0102966 A1 | | 5/2008 | Gleasman |
| 2010/0004064 A1 | | 1/2010 | Hu |
| 2010/0069164 A1 | | 3/2010 | Kobayashi et al. |
| 2011/0229254 A1 | | 9/2011 | Su |
| 2011/0229255 A1 | | 9/2011 | Su |
| 2015/0094157 A1 | | 4/2015 | Lock |
| 2018/0283460 A1 | | 10/2018 | Lock |
| 2019/0195287 A1 | | 6/2019 | Lock |

FOREIGN PATENT DOCUMENTS

| | | |
|---|---|---|
| CN | 202851630 U | 4/2013 |
| CN | 103788817 A | 5/2014 |
| CN | 103788818 A | 5/2014 |
| CN | 103820002 B | 4/2016 |
| CN | 106222582 A | 12/2016 |
| CN | 110709187 A | 1/2020 |
| DE | 4030737 C2 | 4/1992 |
| DE | 19611273 C1 | 9/1997 |
| DE | 10139969 A1 | 2/2003 |
| EP | 0962287 A1 | 12/1999 |
| EP | 3600716 | 2/2020 |
| FR | 2378977 A1 | 8/1978 |
| GB | 457664 A | 12/1936 |
| GB | 1072786 A | 6/1967 |
| GB | 2 136 090 | 1/1986 |
| JP | 07012624 U | 3/1995 |
| JP | 2012-154413 | 8/2012 |
| TW | 201902600 | 1/2019 |
| TW | 1680025 | 12/2019 |
| WO | WO 2015/048562 A1 | 4/2015 |
| WO | WO 2018/183202 | 10/2018 |
| WO | WO 2021/067849 A1 | 4/2021 |

OTHER PUBLICATIONS

International Search Report and Written Opinion in Application No. PCT/US2020/054122 dated Feb. 12, 2021.
U.S. Appl. No. 16/196,527, Universal Joints and Method of Manufacture, filed Nov. 20, 2018.
European Search Report received in European Application No. 18777102.7 dated Nov. 11, 2020 in 7 pages.
International Search Report and Written Opinion in Application No. PCT/US18/24365 dated Jun. 6, 2018.
International Search Report in Taiwan Application No. 107110974 dated Jan. 31, 2019.
McMaster-Carr, Packing List for Purchase Order 0921KLOCK, dated Sep. 21, 2017, in 2 pages.
Schmelz et al., "Universal Joints and Driveshafts—Analysis, Design, Applications," 2006, 2nd Edition, Chapter 2, pp. 53-79, Springer-Verlag Berlin Heidelberb.
International Preliminary Report on Patentability in Application No. PCT/US18/24365 dated Oct. 1, 2019.
European Search Report received in European Application No. 18777102.7 dated Jun. 13, 2022 in 5 pages.

* cited by examiner

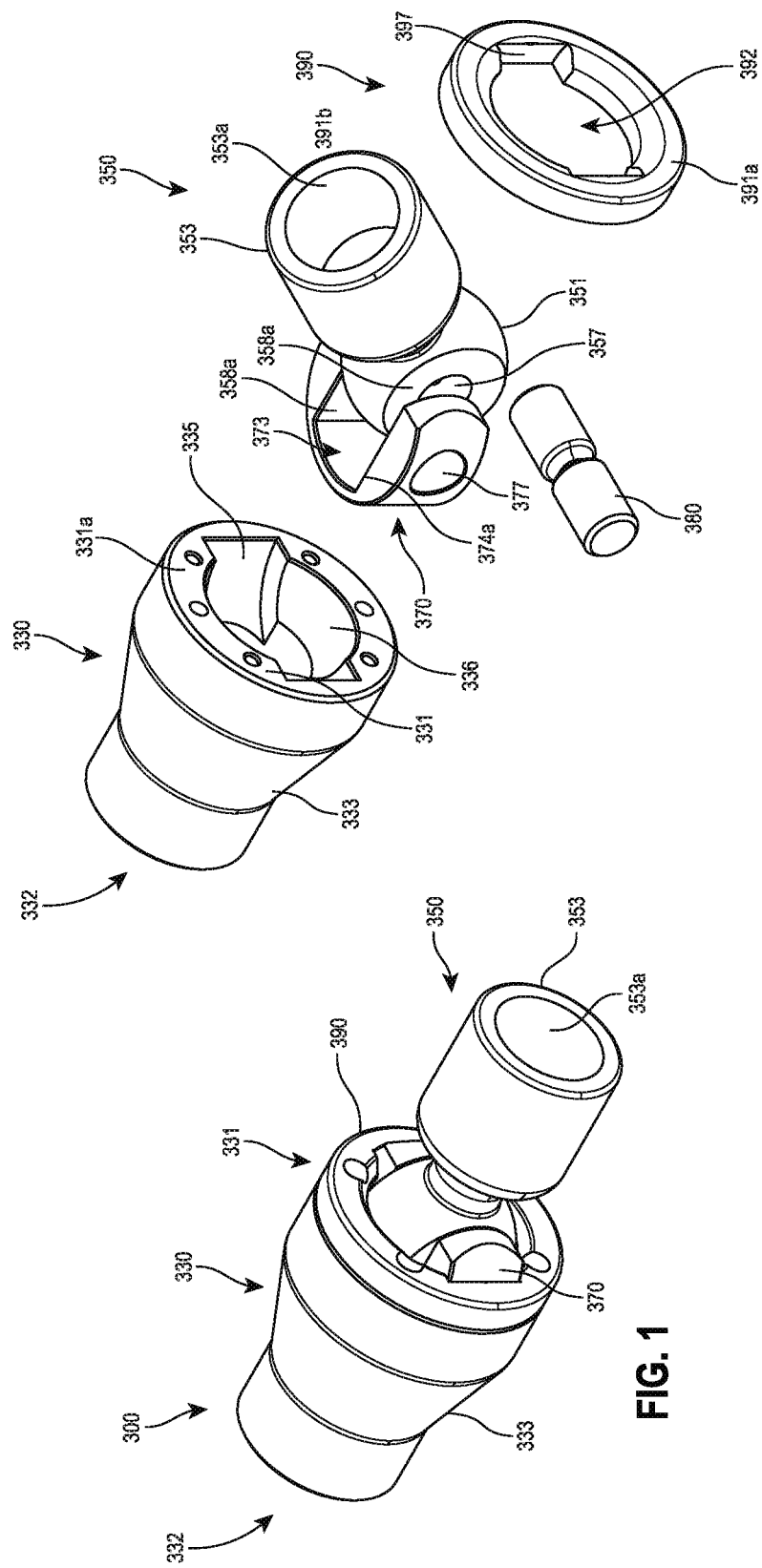

MECHANICAL JOINTS AND APPLICATIONS

CROSS REFERENCE

This application claims the benefit of U.S. Provisional Patent No. 62/910,750, filed Oct. 4, 2019, the entirety of which is hereby incorporated by reference.

BACKGROUND

Field

The present disclosure relates to improved mechanical joints and uses of those mechanical joints for various application such as marine propulsion.

Description of the Related Art

Universal joints are often used for rotationally linking shafts that are oriented at a skewed angle relative to one another. One limitation of existing universal joints is failure under dynamic loading conditions. Dynamic loading of universal joints occurs both from changes in torque in the first shaft that are transmitted across the universal joint to the second shaft and from changes in forces applied to individual components of the universal joint as the joint rotates to maintain the skewed angle. Dynamic loading limits the use of structurally simple universal joints to certain industrial tasks that could benefit from a universal joint having a minimal moment of inertia. These include uses in drive trains, aircraft controls, automotive controls, manufacturing, machine tools, and other areas. Thus, it has become necessary to improve the dynamic loading capacity of existing universal joints through improved manufacturing techniques and improved structures.

SUMMARY

According to a first aspect, a mechanical joint for transferring rotational motion including a housing. The housing has a first end and a second end. A channel is disposed in the first end. A cap ring including a central opening and first and second channel segments. A drive puck includes an outer perimeter, a front face, a rear face, a first wing and a second wing divided by an inner slot. A pin aperture is disposed through the first and second wings. The cap ring is coupled with the first end of the housing, the drive puck is disposed within the channel and the first and second channel segments. A pin is disposed within the pin aperture. A first shaft is rotatably coupled with the drive puck by the pin, such that the first shaft rotates about a first axis with respect to the drive puck and the drive puck rotates about a second axis with respect to the housing. An outer contact surface of the first drive puck is slidingly engaged within the channel and with the first and second channel segments. The outer contact surface includes a high-wear material.

In another aspect, the outer contact surface is on the front and rear faces of the drive puck. In another aspect, the front and rear faces of the drive puck include planar portions. In another aspect, the outer contact surface is on the outer perimeter of the drive puck. In another aspect, the outer contact surface on the outer perimeter is orthogonal to the front and rear faces. In another aspect, the high-wear material includes one of: Kevlar, ceramic materials, molded or woven organic clutch material, carbon fiber, feramic clutch pad material, carbotic clutch pad material, and feramalloy clutch pad material.

According to a second aspect, a mechanical joint for transferring rotational motion, includes a housing having a first end and a second end. A channel is disposed in the first end. a cap ring including a central opening and first and second channel segments. A drive puck includes an outer perimeter, a front face, a rear face, a first wing and a second wing divided by an inner slot, and a pin aperture is disposed through the first and second wings. The cap ring is coupled with the first end of the housing. The drive puck is disposed within the channel and the first and second channel segments. A pin is disposed within the pin aperture, and a first shaft is rotatably coupled with the drive puck by the pin such that the first shaft rotates about a first axis with respect to the drive puck and the drive puck rotates about a second axis with respect to the housing. An outer contact surface of the first drive puck is slidingly engaged within the channel and with the first and second channel segments, the outer contact surface including a plurality of bearings.

In another aspect, the plurality of bearings are on the front and rear faces of the drive puck. In another aspect, the plurality of bearings are on the outer perimeter of the drive puck. In another aspect, the plurality of bearings include roller bearings. In another aspect, the plurality of bearings include needle bearings.

According to a third aspect, An angled transmission assembly includes a housing having a first segment and a second segment. A first rotary bearing is disposed within the first segment and a second rotary bearing is disposed within the second segment. A first shaft is disposed within the first segment, the first shaft coupled with the first bearing and rotatable about a first longitudinal axis. A second shaft is disposed within the second segment and coupled with the second bearing and rotatable about a second longitudinal axis. the first shaft and the second shaft are coupled with a joint for transferring rotational motion from the first shaft to the second shaft, the joint is disposed within the housing. A first drive puck is disposed within a first concavity. A first end of the first shaft pivotably coupled with the first drive puck about a first axis and the first drive puck pivotably coupled with an inner housing member about a second axis. A second drive puck is disposed within a second concavity, a first end of the second shaft pivotably coupled with the second drive puck about a third axis and the second drive puck pivotably coupled with the inner housing member about a fourth axis. The inner housing member is rotatable within the housing about a third longitudinal axis.

In another aspect, a second end of the first shaft includes a male socket attachment and a second end of the second shaft includes a female socket attachment. In another aspect, the first longitudinal axis of the first shaft is disposed at an angle with respect to the second longitudinal axis of the second shaft. In another aspect, the second axis is orthogonal to the fourth axis to phase rotation of the first and second drive shafts. In another aspect, the first housing segment is fixed with respect to the second housing segment such that the angle between the first and second shafts is fixed. In another aspect, the first housing segment is rotatable with respect to the second housing segment about the third longitudinal axis of the inner housing member such that the angle between the first and second shafts is adjustable. In another aspect, an interface between the first housing segment and the second housing segment, the interface including a first member including a plurality of circumferential apertures and a second member including a pin configured to be insertable into one of the plurality of circumferential apertures to fix rotation of the first housing segment with respect to the second housing segment. In another aspect, first housing segment is rotatable with respect to the second housing segment about a housing axis such that the angle between the first and second shafts is adjustable, the housing axis oriented orthogonal to the third longitudinal axis and is disposed through the inner housing member. In another aspect, an interface between the first housing segment and the second housing segment, the interface including a housing pin pivotably coupling the first and second housing segments, the housing pin aligned along the housing axis. A dial member couples with the housing pin, tightening of the dial member fixes rotation between the first and second housing segments and loosening of the dial member allows rotation between the first and second housing segments. In another aspect, the angle between the first and second shafts is adjustable between 90° and 180°. In another aspect, a third housing segment coupled with the second housing segment. a third shaft is disposed within the third housing segment, the third shaft coupled with a third rotary bearing and the second shaft and the third shaft are coupled with a second joint for transferring rotational motion from the second shaft to the third shaft, the second joint is disposed within the housing.

According to a fourth aspect, an inboard marine drive system for a boat having a hull includes an inboard motor disposed within the hull. A transmission couples with the inboard motor. A drive shaft having a first end couples with the transmission and a second end couples with a propeller disposed outside of the hull. The drive shaft includes a first segment and a second segment. The first segment coupled with the second segment by a joint for transferring rotational motion from the first joint to the second joint, the joint includes a housing having a first end with a first concavity and a second end with a second concavity. A first drive puck is disposed within the first concavity and pivotable with respect to the housing about a first axis and a second drive puck is disposed within the second concavity and pivotable with respect to the housing about a second axis. The first shaft segment is coupled with the first drive puck by a first pin and pivotable with respect to the first drive puck about a third axis. The second shaft segment is coupled with the second drive puck by a second pin and pivotable with respect to the second drive puck about a fourth axis.

In another aspect, the first drive shaft segment is rotatable about a first rotation axis and the second drive shaft segment is rotatable about a second rotation axis, the first rotation axis is disposed at a non-zero angle with the second rotation axis. In another aspect, the non-zero angle is between 90° and 180°. In another aspect, the second rotation axis is aligned with a direction of travel of the boat. In another aspect, the housing includes one or more apertures configured to draw water within the first and second concavities. In another aspect, the propeller is disposed forward of a steerable rudder of the boat. In another aspect, a steerable rudder of the boat coupled with the second shaft segment. Adjusting a direction of the steerable rudder adjusts an angle between the first shaft segment and the second shaft segment. In another aspect, the propeller is disposed aft of the steerable rudder of the boat. In another aspect, the propeller is disposed forward of the steerable rudder of the boat and an end of the second shaft segment is coupled with the steerable rudder. In another aspect, the inboard motor, the transmission and the drive shaft one are arranged as a v-drive. In another aspect, the inboard motor, the transmission and the drive shaft one are arranged as a z-drive. In another aspect, a third shaft segment of the drive shaft. the third shaft segment is coupled with the second segment by a second joint for transferring rotational motion from the second joint to the third joint, the second end of the drive shaft is disposed on the third shaft segment. In another aspect, the first shaft segment is rotatable about a first rotation axis, the second drive shaft segment is rotatable about a second rotation axis, and the third drive shaft segment is rotatable about a third rotation axis the first rotation axis is disposed at a first non-zero angle with the second rotation axis and the second rotation axis is disposed at a second non-zero angle with the third rotation axis. In another aspect, the first rotation axis is substantially parallel with the third rotation axis. In another aspect, a control arm couples with the third shaft segment for steering the propeller. the control arm is configured to adjust an orientation of the third shaft segment about the second joint. In another aspect, the control arm is configured to adjust an orientation of the second shaft segment about the first joint. In another aspect, a movable linkage having a first end coupled with the hull and a second end coupled with a mount, the mount coupled with the third shaft segment. the movable linkage, the mount and the second and third shaft segments form a parallel linkage configured to maintain the orientation of the third shaft within a horizontal plane.

According to a fifth aspect, an outboard marine drive system configured for mounting on a boat includes an outboard motor coupled with a transmission. A drive shaft having a first end coupled with the transmission and a second end coupled with a propeller is disposed outside of the hull. The drive shaft includes a first segment and a second segment. The first segment couple2 with the second segment by a joint for transferring rotational motion from the first joint to the second joint, the joint includes a housing having a first end with a first concavity and a second end with a second concavity. A first drive puck is disposed within the first concavity and pivotable with respect to the housing about a first axis and a second drive puck is disposed within the second concavity and pivotable with respect to the housing about a second axis. The first shaft segment is coupled with the first drive puck by a first pin and pivotable with respect to the first drive puck about a third axis, and the second shaft segment is coupled with the second drive puck by a second pin and pivotable with respect to the second drive puck about a fourth axis.

In another aspect, the first drive shaft segment is rotatable about a first rotation axis and the second drive shaft segment is rotatable about a second rotation axis, the first rotation axis is disposed at a non-zero angle with the second rotation axis. In another aspect, the second rotation axis is oriented along a direction of travel of the boat and the second shaft segment includes the second end of the drive shaft having the propeller. According to another aspect, the second end of the housing includes a thrust bearing coupled with the second drive shaft segment. According to another aspect, further including an impeller-driven water line coupled with the drive shaft for cooling the outboard motor. According to another aspect, a rim-drive propeller assembly. According to another aspect, the rim-drive propeller assembly includes a gear housing including one or more gears configured to couple the second shaft segment with a rim drive propeller.

BRIEF DESCRIPTION OF THE DRAWINGS

FIG. 1 is a perspective view of a first mechanical joint.
FIG. 2 an exploded perspective view of the first mechanical joint.

DETAILED DESCRIPTION

Figure 3:
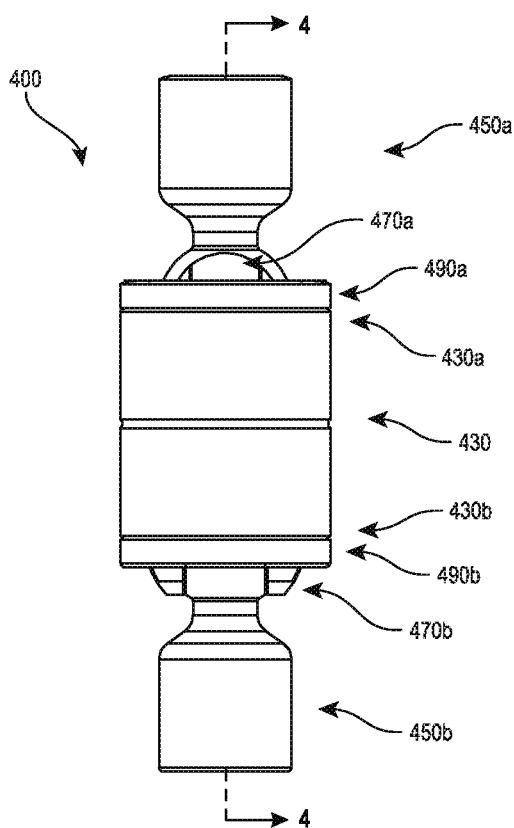
FIG. 3 is a side view of a second mechanical joint.

An aspect of the present disclosure is directed to devices and methods that effectively and efficiently allow for the transmission of rotational forces via axially unaligned axes. The technologies herein are described in the context of mechanical joints and have utility in that context. However, the technologies disclosed also can be used in other contexts as well. Some embodiments also allow for axial loads, such as applied by thrusting, pulling, suspension, and the like, to be readily accepted without interfering with operation of the device.

FIGS. 1-2 show an embodiment of a rotary, mechanical joint 300. The joint 300 is further described in U.S. Pat. No. 10,132,360, which is hereby incorporated by reference in its entirety for all purposes. Joint 300 can include a housing 330, a drive puck 370, a drive member 350, a pin 380 and a cap ring 390. The joint 300 can couple together a first shaft and a second shaft coupled with the housing 330 and the drive member 350, respectively, such that rotation of the first shaft about its longitudinal axis matches rotation of the second shaft about its longitudinal axis. For example, rotation of the first shaft can match rotation of the second shaft in a 1:1 ratio.

The first shaft can be coupled with the housing 330. The second shaft can be coupled with the drive member 350. The drive member 350 can be coupled with the housing 330 by the drive puck 370 and the pin 380. The drive puck 370 can couple with the housing 330 and rotate with respect to the housing 330 about a first axis. The drive member 350 can be coupled with the drive puck 370 and thereby rotate with respect to the housing 330. The drive member 350 can be coupled with the drive puck 370 by the pin 380 and rotatable about the pin 380 with respect to the drive puck 370 about a second axis. In this manner, the drive member 350 can be rotatable with respect to the housing 330. In some embodiments, the first and second axes are substantially orthogonal to each other.

The housing 330 can include a housing body 333 with a first end 331 and a second end 332. The housing body 333 can be tubular in nature and define an inner space. In some embodiments, the inner space extends between the first end 331 and the second end 332 (e.g., through the housing body 333). The second end 332 can include an opening to the inner space. The opening can be circular, square, rectangular, hexagonal, or any other suitable shape. The second end 332 can be configured to be coupled with the first shaft of the joint 300.

The first end 331 of the housing 330 can include a concavity or channel 335. The channel 335 can be formed on the inner surface of the housing body 333. The channel 335 can comprise a cylindrical bottom surface. The cylindrical bottom surface can be disposed about around a single axis of rotation. The single axis of rotation can be located at the first end 331 of the housing 330.

The first end 331 of the housing 330 can further include a concave spherical surface 336. The spherical surface can be disposed within the housing wall 333 adjacent to the opening of the first end 331. The spherical surface 336 can include a partial surface segment or segments of a sphere.

The sphere can be centered at the same point as the single axis of rotation defining the channel 335. The spherical surface 336 can interface with the first end 331 of the housing 330 at an equatorial line of the spherical surface 336.

The first end 331 of the housing 330 can include an interface surface 331a. The cap ring 390 can couple with the housing 330 at the interface surface 331a. The first end 331 can include one or more tapped holes 339a. The cap ring 390 can include one or more corresponding through holes through which one or more screws can be inserted to couple the cap ring 390 with the first end 331 of the housing 330. In some embodiments the first end 331 of the housing 330 can include four tapped holes that are set in a square configuration. The square configuration allows for a stable connection with four sides of the cap ring 390. For alignment purposes, the interface surface 331a and the cap ring 390 can include one or more posts or recesses.

The cap ring 390 can include first and second faces 391a, 391b. The second face 391b can be planar in nature. The cap ring 390 can include the one or more through holes 398 for receiving screws to attach the cap ring 390 with the housing 330. In some embodiments the screw holes 398 include counter sunk portions such that screws can be flush with the first face 391a of the cap ring 390.

The cap ring 390 can further include channel segments 397. The channel segments 397 can be cylindrical in shape. In some embodiments the channel segments 397 are disposed on opposite sides of the cap ring 390 from each other. The channel segments 397 can interface with the second face 391b at an equatorial line.

The cap ring 390 can include a central opening 392. Central opening 392 can be generally circular in nature. The channel segments 397 can be disposed around the central opening 392 (e.g., on opposite sides of the central opening 392), some embodiments of the cap ring 390 can include a chamfer between the first surface 391a and the central opening 392.

The drive puck 370 can include an outer surface 372. The outer surface 372 can have a circular profile when viewed from the top. The outer surface 372 can be a cylindrical surface that is disposed about a central axis. The drive puck 370 can further include first and second wings 375a, 375b. The drive puck 370 can further include an inner slot 373. The first and second wings 375a, 375b can be disposed on opposite sides of the inner slot 373. The inner slot 373 can include first and second sidewalls 374a, 374b. The first and second sidewalls 374a, 374b can be disposed opposite each other within the inner slot 373.

In some embodiments one or both of the sidewalls 374a, 374b comprise planar portions. The planar portions of the first and second sidewalls 374a, 374b can be substantially parallel to each other. A shaft aperture 377 can extend through either one or both of the first and second wings 375a, 375b. The shaft aperture 377 can extend through the first and second wings 375a, 375b or the planar portions of the first and second wings 375a, 375b, in some embodiments.

An upper face of the drive puck 370 can be substantially planar. A lower face of the drive puck can also be substantially planar and substantially parallel to the upper face. In some embodiments one or both of the first and second sidewalls 374a, 374b are set at right angles with either one or both of the upper and lower faces.

The drive puck 370 can be slidingly engaged within the channel 335 of the housing 330. The outer surface 372 of the drive puck 370 can correspond to the first and second channel 335. For example the drive puck 370 can be disposed within the channel 335 and configured to rotate by sliding therein. Thereby the drive puck 370 can rotate substantially in a single plane of motion within the channel 335.

The drive member 350 can include a ball end 351 and a socket end 353. The ball end 351 and the socket end 353 can be coupled together by a neck portion 355. The ball end 351 can include a convex spherical surface 352. The ball end 351 can further include a shaft aperture 357 disposed through the ball end 351. The ball end 351 can include one or more planar regions 358a, 358b on opposite sides of the ball end 351 and can be substantially parallel to each other. The shaft aperture 357 extends through the planar regions 358a, 358b.

The socket end 353 can include a socket 353a. In some embodiments, the socket 353a can be configured to be coupled with the second shaft of the joint 300. For example the socket 353a can include splines and a tap screw for holding the output shaft within the socket 353a. The socket 353a can be circular, square, rectangular, hexagonal, or any other suitable shape. In other embodiments the socket end 353 is a male connector or any other type of connector coupling the drive member 350 with the second shaft. The outer surface of the socket end 353 can be cylindrical or any other suitable shape.

The joint 300 can be assembled by inserting the ball end 351 within the inner slot 373 of the drive puck 370. The drive puck 370 can be pivotally coupled with the ball end 351 of the drive member 350 with the pin 380. The pin 380 can be inserted through the shaft aperture 377 and through the shaft aperture 357. In some embodiments the ball end 351 can further include a set screw for securing the pin 380 within the shaft aperture 357. The set screw is inserted through tapered hole on the ball end 351 of the drive member 350. A tip of the set screw can be inserted into a depression of the pin 380 and thereby maintain it within the shaft aperture 357.

The pin 380 can also be inserted into the shaft aperture 377 of the drive puck 370 to couple the drive puck 370 with the drive member 350. The first and second sides 358a and 358b of the ball end 351 of the drive member 350 can align with and slidingly engaged with the inner sidewalls 374a and 374b of the inner slot 373 of the drive puck 370. The sliding interface of the sidewalls and the first and second surfaces 358a and 358b can provide stability to the rotation of the drive member 350 with respect to the drive puck 370. Further the inner slot 373 allows for a simple insertion of the ball end 351 within the inner slot 373 and disposing the drive puck 370 around the ball end 351.

The concave spherical surface 336 can be slidingly engaged with the convex spherical surface 352 of the drive member 350. When assembled together the components of the joint 300 of the ball end 351 with the convex spherical surface 352 can be slidingly engaged with the concave spherical surface 336 of the housing 330. Thereby compressional loads from between the housing 330 and the drive member 350 can be distributed at least partially through the concave spherical surface 336 and the convex spherical surface 352.

The drive puck 370 can be inserted within the first end 331 of the housing 330 and inserted within the channel 335. The outer surface 372 can be slidingly engaged with the channel 335. The drive puck 370 can slidingly engage with the sidewalls of the channel 335. This configuration can provide stability for the drive puck 370 as it rotates in a single plane within the channel 335. The rotation of the drive puck 370 within the channel 335 can be substantially in the first plane. The rotation of the drive member 350 about the pin 380 within the drive puck 370 can be substantially in the second plane. The first and second planes can be set orthogonal to each other.

The cap ring 390 fits over the drive member 350 and against the first end 331 of the housing 330. Concave spherical surfaces of the cap ring 390 can slidingly engage with the convex spherical surface of the ball end 351 of the drive member 350. The channel segments 397 of the cap ring 390 can align with and slidingly engage with the outer surface 372 of the drive puck 370. The second face 391b can be disposed on the interface 331a. This can include alignment of the post or receiving slot 373 of the housing 330 with corresponding slots or receiving posts of the cap ring 390. The cap ring 390 can be coupled with the first end 331 of the housing 330 by inserting one or more screws through the screw holes of the cap ring 390 and into the corresponding tapped holes of the housing 330.

Once assembled the socket end 353 of the drive member 350 can be pivoted in the first and second planes with respect to the housing 330. In some embodiments, rotation of the socket end 353 with respect to the housing 330 is only limited by its interference with the cap ring 390.

Figure 4:
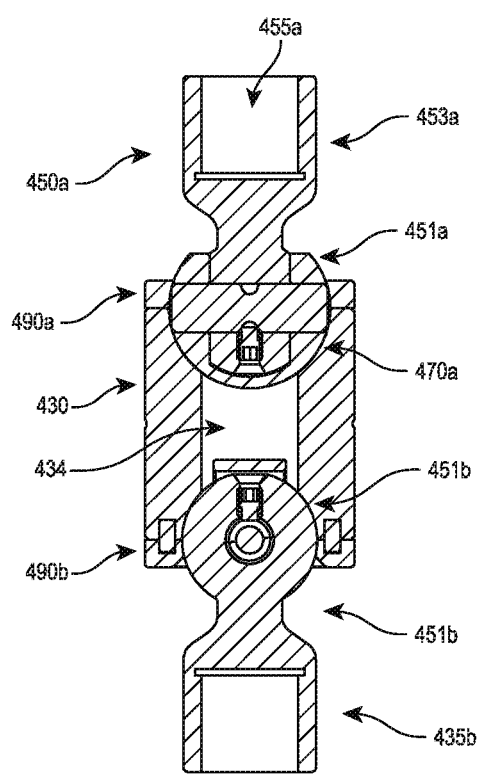
FIG. 4 is a section view along the line 4-4 in FIG. 3.

FIGS. 3-4 show another embodiment of mechanical joint 400. Joint 400 can couple together a first shaft and a second shaft (not shown) such that rotation of the first shaft about its longitudinal axis transfers to rotation of the second shaft about its longitudinal axis. Joint 400 can be a double-sided version of the joint 300, having the same or similarly structure components thereof.

Joint 400 can include a housing 430 with first and second ends 430a, 430b having respective semi-circular concavities or channels 435a, 435b. The joint 400 can include first and second drive pucks, 470a, 470b. The first and second drive pucks can be disposed with the respective channels 435a, 435b. First and second drive members 450a, 450b can be pivotably coupled with the first and second drive pucks 470a, 470b, by corresponding pins 480a, 480b. First and second cap rings 490a, 490b can secure the first and second drive pucks 470a, 470b within the respective first and second channels 435a, 435b. The first and second drive members 450a, 450b can be coupled with first and second ends 430a, 430b of the housing 430 by the first and second drive pucks 470a, 470b, respectively. The first drive puck 470a can be coupled with the first end 430a and rotate with respect to the housing 430 in a first plane.

The first drive member 450a can be coupled with the first drive puck 470a and thereby rotate with respect to the housing 430 about a first axis. The first drive member 450a can be coupled with the first drive puck 470a by a first pin 480a. The first drive member 450a can be rotatable about the first pin 480a with respect to the first drive puck 470a about a second axis. In this manner, the first drive member 450a can be rotatable with respect to the housing 430 in both the first and second axes. In some embodiments, the first and second axes are substantially orthogonal to each other.

Similar to the first end 430a of the housing 430, the second end 430b can couple with the second drive puck 470b. The second drive puck 470b can be rotatable with respect to the housing 430 about a third axis. The second drive member 450b can be coupled with the second drive puck 470b and thereby rotate with respect to the housing 430 in the third plane 403. The second drive member 450b can be coupled with the second drive puck 470b by a second pin 480b. The second drive member 450b can be rotatable about the second pin 480b with respect to the second drive puck 470b about a fourth axis. In this manner, the second drive member 450b can be rotatable with respect to the housing 430 in both the third 403 and fourth planes 404. In some embodiments, the third and fourth axis are substantially orthogonal to each other.

An angle between the first and the second shaft can be adjusted between approximately 0° and a maximum of approximately 90° to 100°. In some embodiments of the joint 400, it can be advantageous to create maximum angle of approximately 90°. The angle 419 can be maintained as the joint 400 rotates by corresponding rotations of the first and second drive pucks 470a, 470b about first and third axes and by rotation of the first and second drive members 450a, 450b within the second and fourth axes.

In a joint with a single rotational angle (e.g., joint 300), the rotational speed of the first shaft coupled with the joint does not always match the rotational speed of the second shaft coupled with the joint. Where the angle between the first and second shaft is substantially zero, the rotational speeds of the first and second shafts match. However at non-zero angles, a fluctuation (e.g., a sinusoidal variation in the rotational velocity) occurs across the joint. For example, first shaft can be angled at 45° with the second shaft and the first shaft can have a constant rotational speed. Here, the rotational speed of the second shaft will fluctuate with respect to the constant speed of the first shaft in a sinusoidal pattern. The greater the angle, the greater the peak of the fluctuating rotational speed. This fluctuating rotational speed can typically be felt as a vibration of the joint during rotation.

To obtain a constant velocity between the first and second shafts, a second angle can be added to the joint to phase out the fluctuations entered at the first angle. In some embodiments of the joint 400, the first and third axes and the second and fourth axes can be substantially orthogonal to each other. This phases the fluctuations entered by each of the angles to be substantially opposite each other. Furthermore, the angles can be maintained substantially equal to each other such that the magnitude of the fluctuations entered at both angles will be approximately equal and therefore cancel each out. In such a configuration, the joint 400 can be used as a constant velocity joint with rotation of the first joint matching rotation of the second joint. In other embodiments, the first and third axes (and/or the second and fourth axes) can be substantially parallel to each other, but this will not typically result in a constant-velocity joint.

Figure 5:
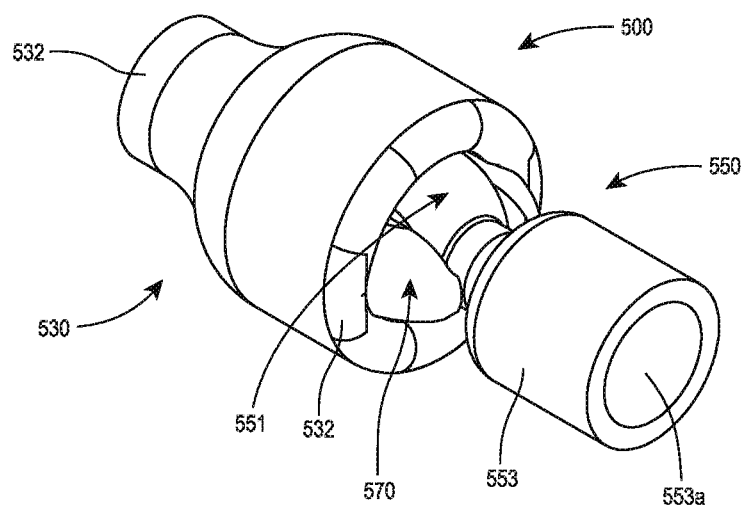
FIG. 5 is a perspective view of a third mechanical joint.
Figure 6:
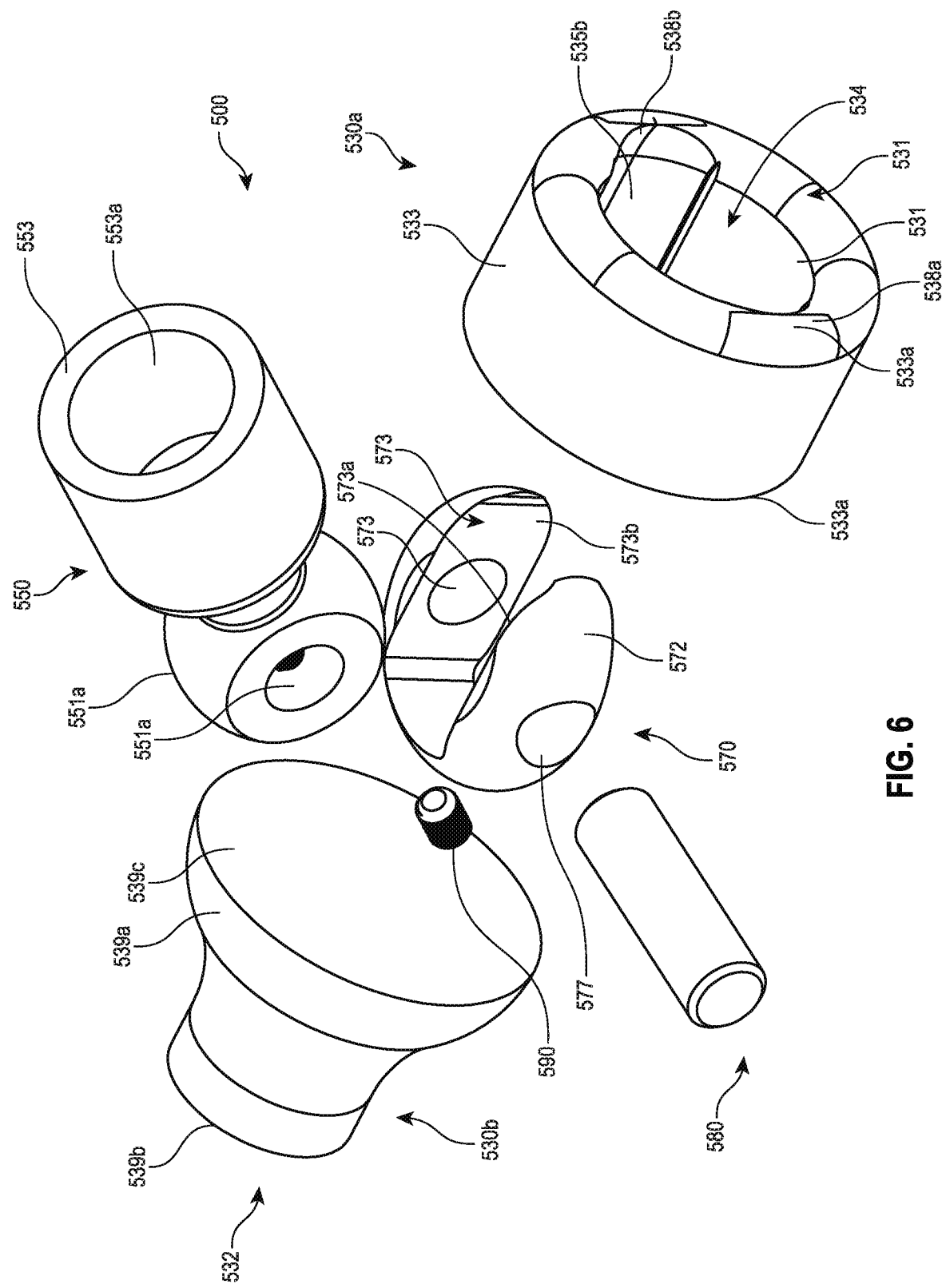
FIG. 6 is an exploded assembly view of the third mechanical joint.
Figure 7:
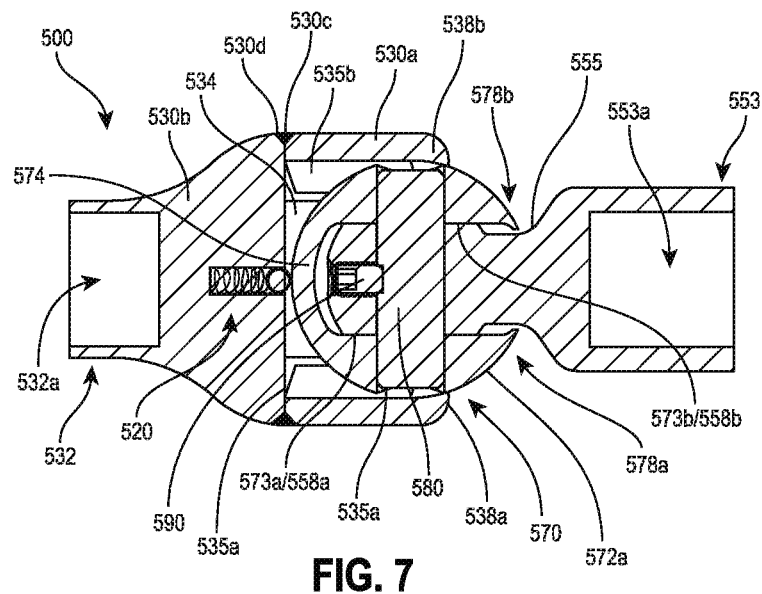
FIG. 7 is a section view of the third mechanical joint.

FIGS. 5-7 show another embodiment of a mechanical joint 500. The joint 500 can rotatably couple together first and second shafts, similar to the joint described above.

The joint 500 can include a housing 500. The housing 530 can include first and second housing sections 530a, 530b. The first housing section 530a can include an outer casing 533. The outer casing 533 can include an inner surface. The inner surface can be disposed around and/or defining a central cavity 534 of the outer casing 533. The first housing section 530a can include a concavity or first and second grooves 535a, 535b. The first and second grooves 535a, 535b can be disposed on opposite sides of the central cavity 534. The first and second grooves 535a, 535b can be cylindrical in shape. The first and second grooves 535a, 535b can be disposed within the inner surface of the outer casing 533. The first and second grooves 535a, 535b can be can extend from a first end 533a to a second end 533b of the first housing section 530a. The first end 533a of the housing section 530a can include a flat surface that can be interfaced and joined with the second housing section 530b of the housing 530 as described below. The first housing section 530a can include first and second lips 538a, 538b. The first lip 538a can be aligned with the first groove 535a. The second lip 538b can be aligned with the second groove 535b.

The second housing section 530b of the housing 530 can interface with the first end 533a of the first housing section 530a at an interface 530c. In some embodiments, the interface 530c can be a weld (e.g., conventional welding techniques, laser beam welding, magnetic pulse welding, or friction stir welding). In other embodiments, the interface can be mechanical couplings (e.g., screws, tongue and groove, or interference fittings). In some embodiments, the interface 530c is an electron beam weld. An electron weld can be advantageous because it generates low heat in coupling together the first and second housing sections 530a, 530b. The second housing section 530b can include the second aperture 532a.

The drive puck 570 can include a first wing and a second wing and an inner slot 573 therebetween. An outer periphery of the drive puck 570 can be circular about a central axis. The drive puck 570 can include a convex sliding surface 572. The convex sliding surface 572 can correspond to the shape of the concave sliding surfaces and of the first and second grooves 535a, 535b. The inner slot 573 can comprise a first inner side 573a and a second inner side 573b. The first and second inner slides 573a, 573b can include substantially planer portions. The substantially planer portions can be disposed on opposite sides of the inner slot 573. The substantially planer portions can substantially parallel to each other.

An aperture 577 is disposed through one or both of the first and second wings 571a, 571b. The aperture 577 can extend through the central axis of the drive puck 570. The aperture 577 can extend through the planar portions of the inner sides 573a, 573b.

The drive member 550 can include an inner end 551 and an outer end 553. The inner end 551 and the outer end 553 can be coupled together by a neck portion 555. The inner end 551 can include an outer surface 551a. As explained further below, the inner end 551 need not be spherical, but can be any desirable shape. The inner end 551 can further include a shaft 557 disposed through the inner end 551. The inner end 551 can include one or more planar regions 558a, 558b. For example the ball end 511 can include first and second planar regions 558a, 558b. The planar regions 558a, 558b can be disposed on opposite sides of the inner end 551 and can be substantially parallel to each other. In some embodiments, the aperture 557 extends through the planar regions 558a, 558b. The inner end 551 can further include a tapped hole for a set screw.

The outer end 553 can include a socket 553a. In some embodiments, the socket 553a can be configured to be coupled with the first shaft of the joint 500. For example the socket 553a can include splines and a tap screw for holding the output shaft within the socket 553a. The socket 553a can be circular, square, rectangular, hexagonal, or any other suitable shape. In other embodiments the outer end 553 is a male connector or any other type of connector coupling the drive member 550 with the second shaft. The outer surface of the outer end 553 can be cylindrical or any other suitable shape.

To assembly the joint 500, the drive puck 570 can be inserted within the first housing section 530a of the housing 530. The drive puck 570 can be inserted into the first and second grooves 535a, 535b. The first and second concave sliding surfaces can be slidingly engaged with the convex sliding surface 572 of the drive puck 570. The drive puck 570 can be rotatable within the first and second grooves 535a, 535b about a first axis.

The drive member 550 can be coupled with the drive puck 570 by a pin 580 and rotatable about a second axis. The pin 580 can extend into the apertures 557 and 577 of the drive member 550 and drive puck 570, respectively. The pin can be secured within the apertures 557 and 577 by the set screw 590. The inner end 551 of the drive member 550 can be inserted into the central cavity 534 of the first housing section 530a. The diameter of the inner end 551 must be smaller than the opening of the central cavity 534 at the first end 531 of the housing 530.

The second housing section 530b can be assembled with the first housing section 530a. The first housing section 530a is slid over the drive member 550 and interfaced with the second housing section 530b. For example, the first and second housing sections 530a, 530b, can be welded together or otherwise assembled at the interface 530c. In some embodiments, this can be done with the drive puck 570 already inserted within the first housing section 530a and coupled with the drive member 550.

A weld 530d at the interface 530c can extend into the outer casing 533. Desirably, the weld 530d and/or welding process can avoid altering the dimensions of the grooves 535a, 535b. Nonetheless, the altering of the grooves 535a, 535b at the first end 533a of the housing 530a can be acceptable where it does not interfere with rotation of the drive puck 570. As noted above, electron beam welding generates little heat and can create deep welds into a material to provide a firm coupling of the first and second housing sections 530a, 530b.

In some embodiments, the lips 538a, 538b can comprise a sharp or squared corner to prevent the drive puck 570 from being removed from the grooves 535a, 535b. In other embodiments, a toroidal surface of the concave sliding surfaces can match the profile of the outer periphery 572 of the drive puck 570. This can reduce friction and prolong service life of the drive puck and the housing 530 by minimizing high-pressure contact areas between the drive puck 570 and the grooves 535a, 535b.

In some embodiments, the central cavity 534 can comprise a tensioning mechanism 520. For example, the tensioning mechanism 520 can comprise a spring-loaded steel ball bearing. The ball bearing can contact the outer periphery 572a of the drive puck 570. In some embodiments, the ball bearing can apply pressure to the outer periphery 572a to bias the drive puck 570 against the lips 538a, 583b. This can reduce or minimize vibration and play in the joint 500 during rotation of the assembly. Other tensioning mechanisms 520 can include, but are not limited to, a plastic or metal insert with the central cavity 534 and a coating of the planar surface of the section housing section 530a.

The joint 500 can include a housing 530, drive puck 570 and a drive member 550. A first end 551 of the drive member 550 can be rotatably coupled with the drive puck 570. A second end 553 of the drive member 550 can be configured to be coupled with a first shaft. For example, the second end 553 can comprise an aperture 553a for receiving an end of the first shaft. The drive puck 570 can be rotatably coupled with the housing 530. Specifically the drive puck 570 can be coupled at a first end 531 of the housing 530. A second end 532 of the housing 530 can configured to be coupled with a second shaft. For example, in some embodiments the second end 532 of the housing 530 includes a recess 532a for receiving an end of the second shaft (e.g., an output shaft).

In this manner, the first and second shafts can be coupled together such that rotation from the first shaft can be transferred to rotation of the second shaft through the joint 500. In addition, an angle can be had between the first and second shafts and maintained during rotation of the first and second shafts and joint 500. The drive member 550 can be rotatable about a first axis with respect to the housing 530. The drive puck 570 can be rotatable within about a second axis with respect to the housing 530. The first and second plane 501, 502 can be substantially orthogonal. This configuration can allow for rotation of the joint 500 while maintaining the angle.

Figure 8:
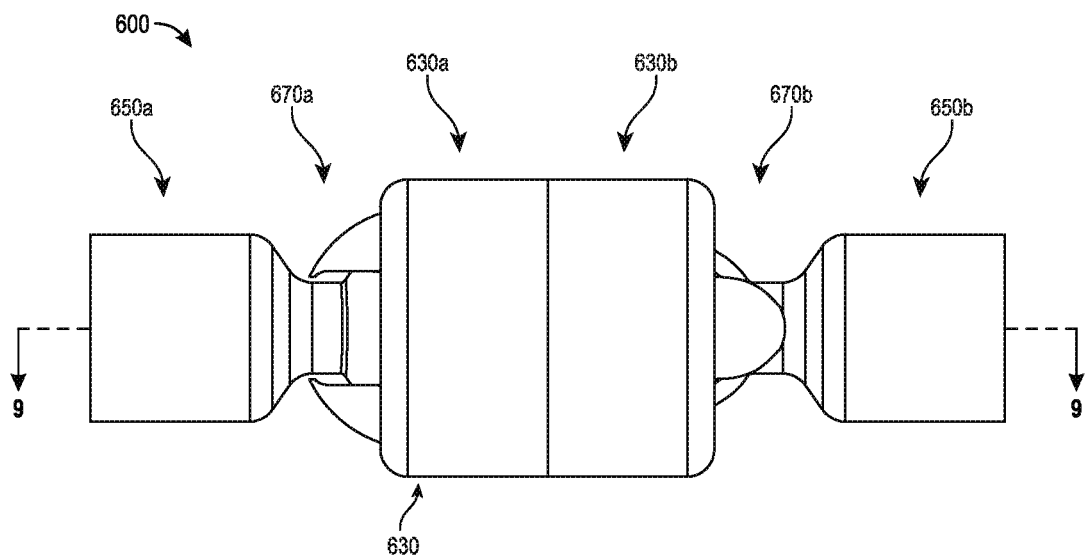
FIG. 8 is a side view of a fourth mechanical joint.
Figure 9:
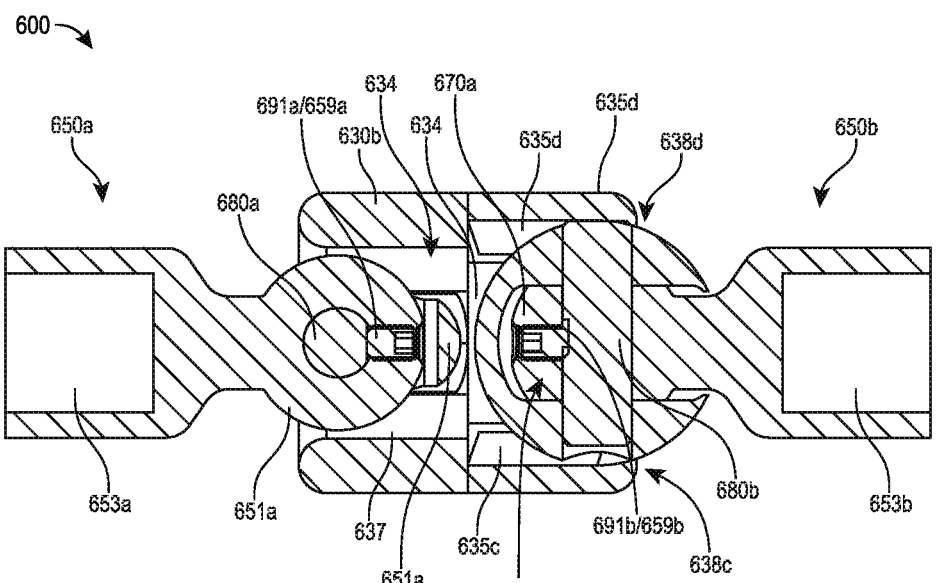
FIG. 9 is a section view along the line 9-9 in FIG. 8.

FIGS. 8-9 show another embodiment of mechanical joint 600. Like the joint 400, the joint 600 can couple together a first shaft and a second shaft (not shown) such that rotation of the first shaft about its longitudinal axis transfers to rotation of the second shaft about its longitudinal axis. For example, rotation of the first shaft can match rotation of the second shaft. Joint 600 can include a housing 630 with first and second housing sections 630a, 630b. Each of the first and second housing sections 630a, 630b can include a structure similar to the housing 630 described above.

The joint 600 can include first and second drive pucks, 670a, 670b, first and second drive members 650a, 650b and first and second pins 680a, 680b. The first shaft can be coupled with the first drive member 650a. The second shaft can be coupled with the second drive member 650b. The first and second drive members 650a, 650b can be coupled with first and second housing sections 630a, 630b of the housing 630 by the first and second drive pucks 670a, 670b, respectively. The first drive puck 670a can be coupled with the first housing section 630a and rotate with respect to the housing 630 about a first axis. The first drive member 650a can be coupled with the first drive puck 670a by the first pin 680a and thereby rotate with respect to the housing 630 in a second axis. In this manner, the first drive member 650a can be rotatable with respect to the housing 630 about the first and second axes. In some embodiments, the first and second axes are substantially orthogonal to each other.

The second housing section 630b can couple with the second drive puck 670b. The second drive puck 670b can be rotatable with respect to the housing 630 about a third axis. The second drive member 650b can be coupled with the second drive puck 670b by the second pin 680b and thereby rotate with respect to the housing 630 about a fourth axis. In some embodiments, the third and fourth axes are substantially orthogonal to each other.

The first drive member 650a can be rotated to an angle with respect to a longitudinal axis of the housing 630. Angle can be maintained during rotation of the first shaft and joint 600 by sliding of the first drive member 650a and/or the first drive puck 670a with respect to the housing 630 about the first and second axes, respectively. The second drive member 650b can be rotated to an angle with respect to a longitudinal axis of the housing 630. The second angle can be maintained with respect to a longitudinal axis of the housing 630 during rotation of the second shaft and joint 600 by rotation of the second drive member 650b and/or the second drive puck 670b about the third and fourth axes respectively.

An angle between the first and the second shafts can be adjusted between approximately 0° and a maximum of approximately 90° to 100°. In some embodiments of the joint 600, it can be advantageous to create maximum angle of 90°. The angle across the joint 600 can be maintained as the joint 600 rotates by corresponding rotations of the first and second drive pucks 670a, 670b about the first and third axes and by rotation of the first and second drive members 650a, 650b about the second and fourth axes.

As explained above in relation to joint 400, in a joint with a single rotational angle (e.g., joint 500), the rotational speed of the first shaft coupled with the joint does not always match the rotational speed of the second shaft coupled with the joint, depending on the angle. The joint 600 can be used as a constant velocity joint provided the angles of the two sides are approximately equivalent and the first and third axes and the second and fourth axes are substantially orthogonal to each other. This configuration provides the advantages of substantially reducing vibration of the joint 600 during rotation.

The first and second drive pucks 670a, 670b can have the same structure as described above in relation to the drive puck 570. The first and second drive members 650a, 650b can have the same structure as described above in relation to the drive member 550. The first and second drive members 650a, 650b can include first ends 651a, 651b, and second ends 653a, 653b, respectively. The first and second pins 680a, 680b can have the same structure as described above in relation to pin 580.

The housing 630 can include a housing casing 633 with the first and second housing sections 630a, 630b. The housing casing 633 can be tubular in nature and an inner wall of the housing casing 633 can define an central cavity 634. In some embodiments, the central cavity 634 extends through the housing casing 633. In some embodiments, the second housing section 630b can be configured to be machined separately and coupled with the first housing section 630a at an interface 630c, such as by welding or mechanical fasteners, as described above in connection with the housing 530.

Each of the first and second housing sections 630a, 630b can have substantially the same structural components as the first housing section 530a of the joint 500. In some embodiments, the first housing section 530a can be manufactured as a modular component that can be coupled with the second housing section 530b as a part of the joint 500 or it can be coupled with another modular housing section (e.g., housing section 630b) to form a part of the joint 600. The modular nature of the first housing section 630a provides the advantages of reducing the necessary inventory that a manufacturing needs on hand and reduces the cost and complexity of building parts for each of the joints 500 and 600.

The first housing section 630a can include a concavity in the form of first and second grooves 635a, 635b. The first and second grooves 635a, 635b can be disposed on opposite sides of the central cavity 634. The first and second grooves 635a, 635b can be disposed within the inner surface of the housing casing 633. The first and second grooves 635a, 635b can include first and second concave sliding surfaces, respectively. The first and second concave sliding surfaces can extend from an inner end to the outer end of the first housing section 630a.

The first housing section 630a can include first and second lips 638a, 638b. In some embodiments, the first and second lips 638a, 638b are at the outer end 633a of the housing section 630a. The first and second concave sliding surfaces 636a, 636b can extend at least partially across the lips 638a, 638b, respecttfully. Where the concave sliding surfaces 636a, 636b cross the lips 638a, 638b, the concave sliding surfaces 636a, 636b can each compromise a circular radius of curvature that is circular or substantially circular and/or matches the shape of the drive puck 670a. The second housing section 630b can have the same structure as the first housing section 630a.

The joint 600 can be assembled by inserting an inner end 651a of the first drive member 650a within an inner slot of the first drive puck 670a. The first drive puck 670a can be pivotally coupled with the inner end 651a with the first pin

680a. In some embodiments a set screw 690 can secure first pin 680a in place through a hole 659a. The first drive puck 670a can be inserted within the grooves 635a, 635b. An outer surface 672a of the first drive puck 670a can be slidingly engaged with the concave sliding surfaces 636a, 636b. The first drive puck 670a can rotate about within the grooves 635a, 635b and within the first axis. The first drive member 650a can rotate about the first pin 680a within the second plane 602.

The second drive member 650b can be assembled with an inner slot of the second drive puck 670b and assembled therewith by the second pin 680b. The second drive puck 670b can be assembled within third and fourth grooves 635c, 635d and rotate within the third axis. The second drive member 650b can rotate about the second pin 680b and within the fourth axis. Once assembled the first and second drive members 650a, 650b can be pivoted to the angles with respect to the housing 630.

In some embodiments, the central cavity 634 can comprise a tensioning mechanism (not shown). For example, the tensioning mechanism can comprise a plastic or metal insert within the central cavity 634. As an insert, the tensioning mechanism can comprise two grooves on opposite sides of the insert (either parallel or crossways at an angle to each other, depending on the orientation of the first and second drive pucks 670a, 670b) that contact the outer surfaces of the first and second drive pucks 670a, 670b. In some embodiments, the insert can apply pressure to the outer surfaces to bias the first and second drive pucks 670a, 670b against the respective lips 638a-b, 638c-d of the first and second housing sections 630a, 630b. For example, the insert can include one or more springs to apply pressure against the first and second drive pucks 670a, 670b. This can reduce or minimize vibration and play in the joint 600 during rotation and/or movement of the assembly.

In some embodiments, the central cavity 634 can extend all the way through both the first and second housing sections 630a, 630b. This configuration can allow for a lubricant to be inserted within the central cavity 634 from either end of the housing 630 and coat the sliding surfaces of the joint 600. In some embodiments, the lubricant can cool the components of the joint 600. In some embodiments, the central cavity 634 can thus provide advantages of facilitating the lubrication and/or cleaning of the joint 600 without the need to disassemble the components of the joint 600.

In some embodiments, the central cavity 634 can allow for the lubricant to flow through the housing 630 in a continuous or intermittent manner. A through-space, similar to through space 534a can be disposed between the drive members 650a, 650b and the inner surface 637. This arrangement can facilitate application of the lubricant into and through the central cavity 634. In some embodiments, the flow of the lubricant can be further facilitated by a plurality of perforations extending all the way through either or both of the first and second drive pucks 670a, 670b and/or the first and second drive members 650a, 650b. The plurality of perforations can extend in any direction or various directions to facilitate the lubricant flow.

Figure 10:
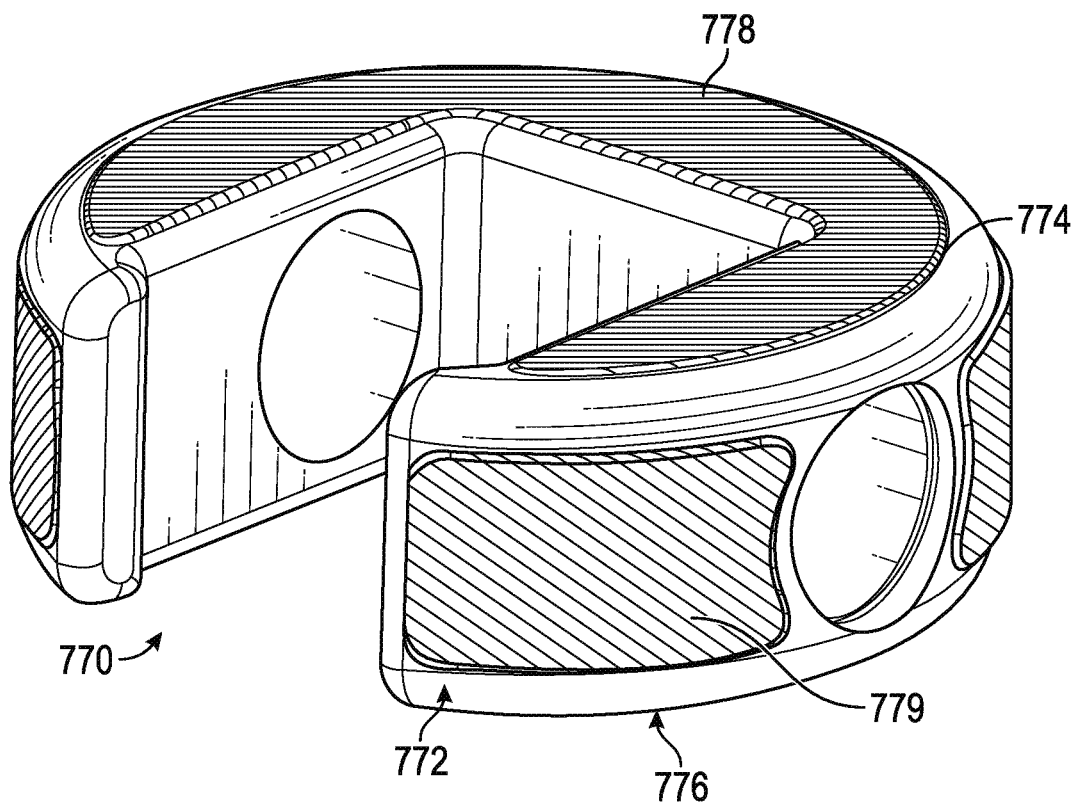
FIG. 10 illustrates a puck including a wear material.

FIG. 10 illustrates an embodiment of a drive puck 770. The drive puck 770 can be similar to any of the drive pucks described above (e.g., 370, 570). The drive puck 770 can include an outer cylindrical or curved surface 772. The drive puck 770 can include first and/or second side faces 774, 776.

The first and/or second side faces 774, 776 can be attached with a wear material 778. The wear material can be riveted or adhered or otherwise attached to first and/or second side faces 774, 776. In some implementations, first and/or second side faces 774, 776 can be recessed to accommodate additional thickness of the wear material 778. Exemplary wear materials include: organic resin/ceramic with high copper content; Kevlar, ceramics (e.g., sintered or brazed silicon dioxide with additives such as copper iron, tin, bronze, and/or graphite), molded or woven organic clutch material (e.g., fiberglass), carbon fiber, feramic clutch pad material, carbotic clutch pad material, feramalloy clutch pad material, or other suitable materials for long-wearing and friction reduction.

The outer surface 772 of the drive puck 770 can similarly include a wear material 779. The wear material 779 can be manufactured to match the curvature of the outer surface 772 and/or be flexible. The wear material 779 that can be adhered or riveted or otherwise attached to the outer surface. The outer surface 772 can also be recessed to accommodate additional thickness of the fibrous material 779. The wear material 779 can be made of any of the above-listed wear material or other suitable materials for long-wearing and friction reduction. The wear materials can comprise planar (e.g., laminate) or curved substrates. The wear materials can be separated in one or more segments to avoid apertures and slots on the puck 770.

Figure 11:
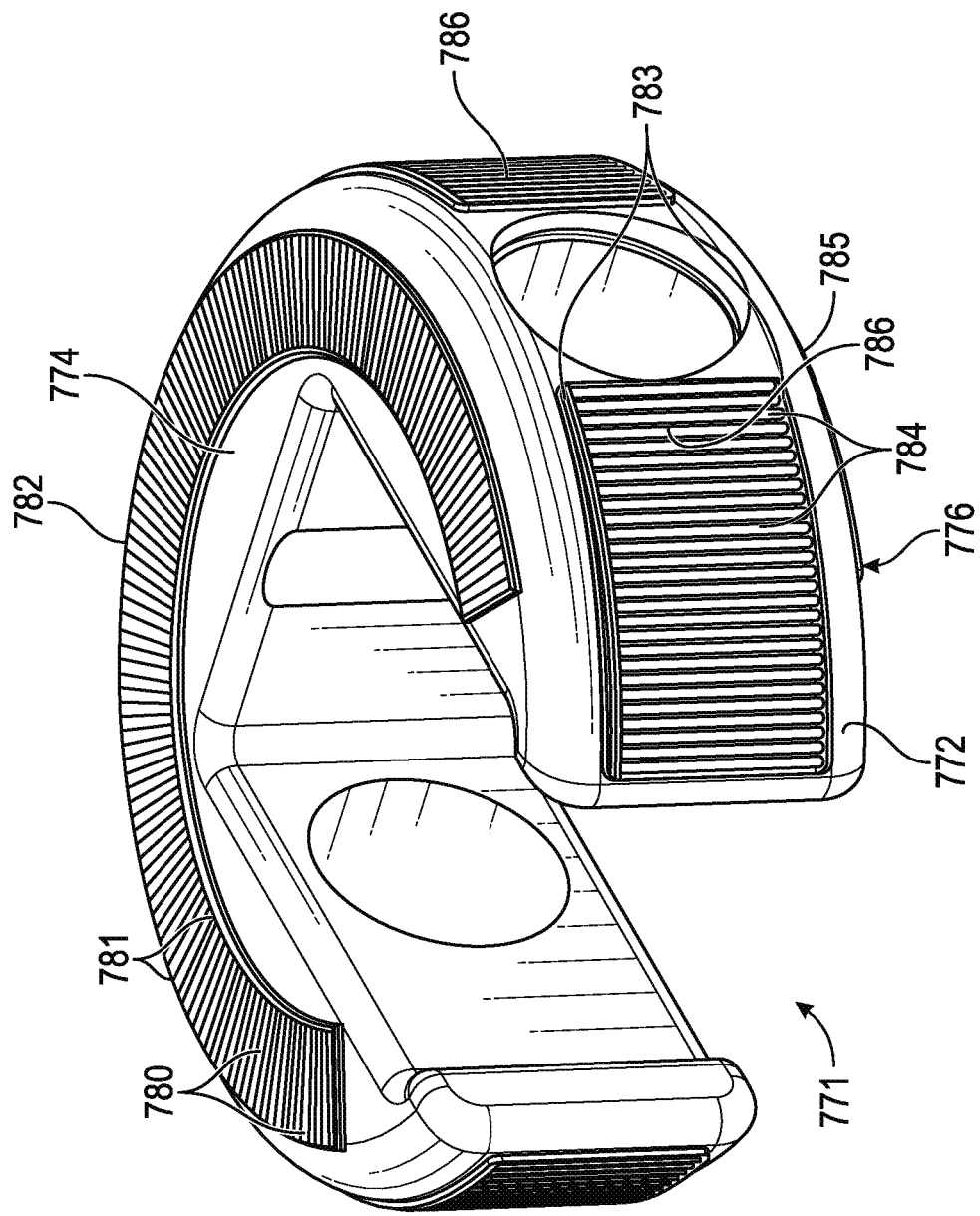
FIG. 11 illustrates a puck including one or more bearings thereon.

FIG. 11 illustrates an embodiment of another drive puck 771. The drive puck 771 can include an outer surface 772 and/or first and/or second side faces 774, 776. A bearing assembly 782 (e.g., roller or needle bearings) can be attached to side faces 776. A second bearing assembly 785 (e.g., roller or needle bearings) can be attached to side faces 774. The bearing assembly 782 can include a plurality of rollers 780 and a cage 781 providing support to the rollers 780. The cage 781 can include parallel arc-shaped bars supporting opposite ends of the rollers 780. In one implementation, the rollers 780 can include individual pins or pivot members that are connected with the structure of the cage 781. In other implementations, the rollers 780 can be floating within the cage 781. Similarly The bearing assembly 780 can be generally arc-shaped and follow the outer circular shape of the drive puck 771. The individual rollers 780 can be radially aligned with a center point of the outer circular shape of the drive puck 771. Thus any rotational motion of the drive puck 771 will be facilitated by rolling of the individual rollers 780.

The outer cylindrical surface 772 can be coupled with a bearing 786. Bearing 786 can include a plurality of rollers 784 and a supporting cage 783. The rollers 784 can optionally be fixed to pivot in place by connection with the cage 783 or can be floating with ends contained within the cage 783 (e.g., rollers 784 are allowed to move circumferentially within the cage 783).

The bearings 780, 786 can be assembled within a joint housing by being placed in contact with the outer surface 772, 774, 776, respectively, and then slipped into enlarged channels or grooves of the joint housing (e.g., channel 335).

Figure 12:
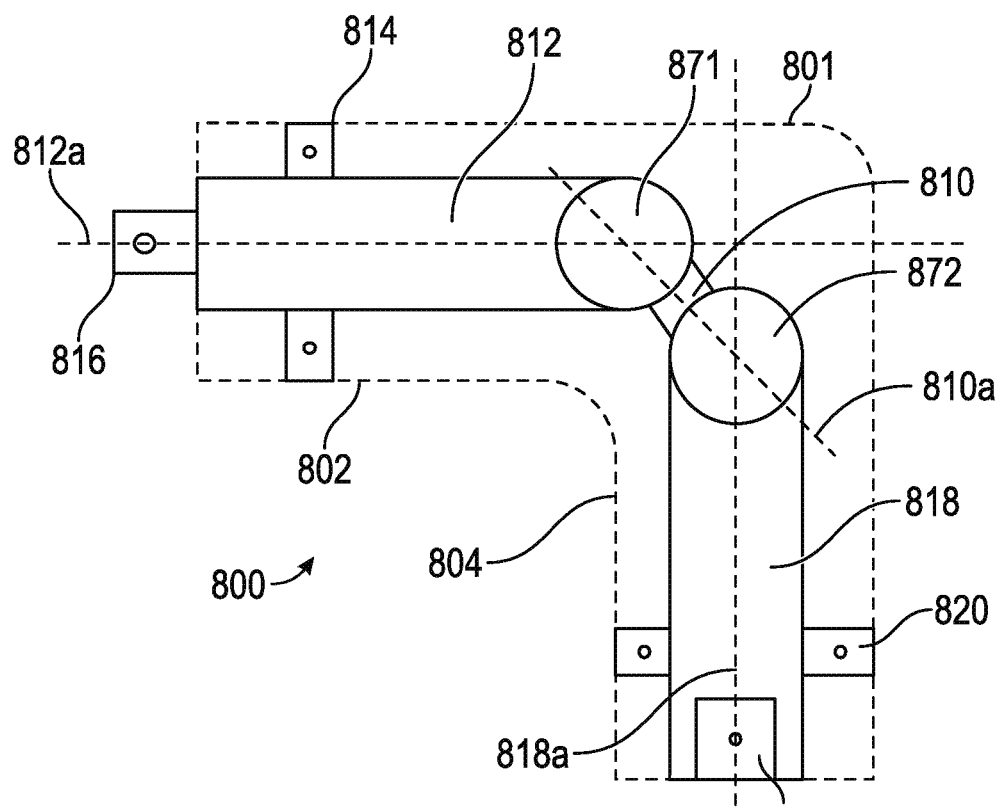
FIG. 12 shows a fixed mechanical joint housing.
Figure 13:
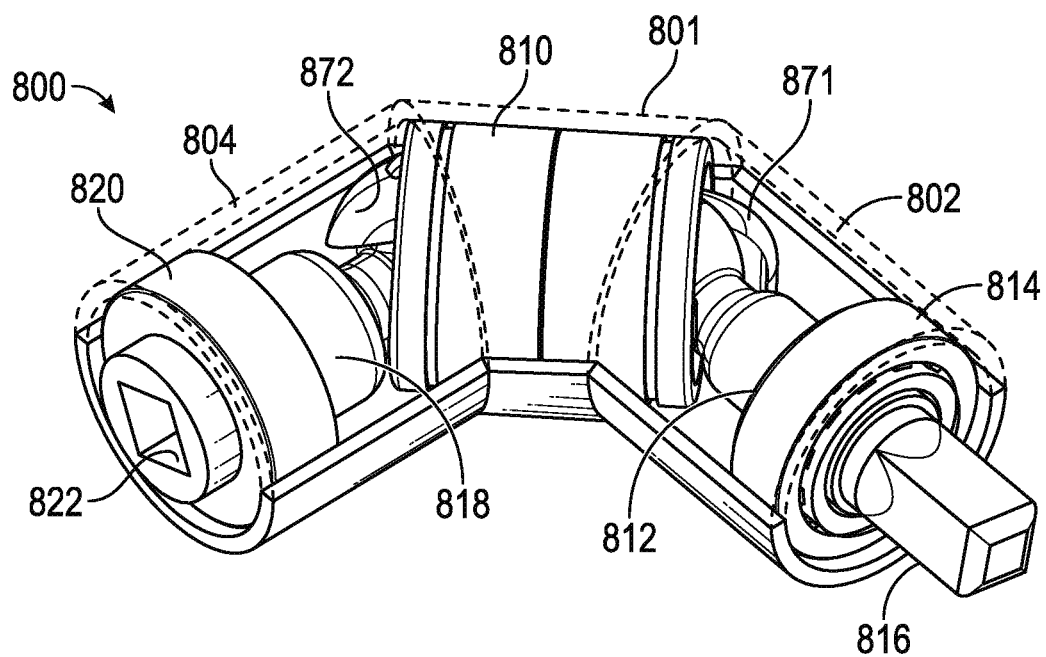
FIG. 13 shows a perspective view of the fixed mechanical joint housing.

FIGS. 12-13 illustrates a fixed joint housing 800. The housing 800 can be made of cast aluminum or other suitable materials. The housing 800 can include first and second segments 802 and 804. The first and second wings can meet at an angle. The angle between the first and second wings 802, 804 can optionally be between 45-degrees and 135 degrees (e.g., at 90 degrees, as illustrated). The angle between the first and second wings 802, 804 can be fixed by the structure of the housing 800.

The housing 800 can include a joint 810. The joint 810 can be a 90-degree angled mechanical joint such as any of the joint embodiments disclosed above (e.g., joint 400 or joint 600). The joint 810 can include an inner housing rotatable about an axis 810a relative to the housing 801. A first shaft 812 extending from the joint 810 can extend down the first segment 802 and rotate about axis 812a. A first puck 871 can be pivotably coupled with the housing and the first shaft 812 can be pivotably coupled with the first puck 871. The first segment 802 can include a bearing 814. The bearing 814 can hold the drive shafts 812 steady as it rotates within the housing 800. The bearing 814 can be a thrust bearing. An outer end 816 of the drive shaft 812 can include an attachment mechanism. The attachment mechanism can be a male socket adapter (e.g., one quarter inch, three-eighths inch, one-half inch).

A second shaft 818 rotatable about axis 818a, can extend from an opposite end of the joint 810. A second puck 872 can be pivotably coupled with the housing and the second shaft 818 can be pivotably coupled with the second puck 872. The first segment 802 can include a bearing 814. The second shaft 818 can extend within the second segment 804. A bearing 820 can be located within the second segment 804 and couple rotationally with the drive shaft 818. The bearing 820 can hold the drive shaft 818 in place and allow it to rotate within the housing 800. The bearing 820 can be a thrust bearing. An outer end 822 of the drive shaft 818 can include an attachment mechanism. The attachment mechanism can be a female socket adapter (e.g., matching the male socket adapter).

Figure 14:
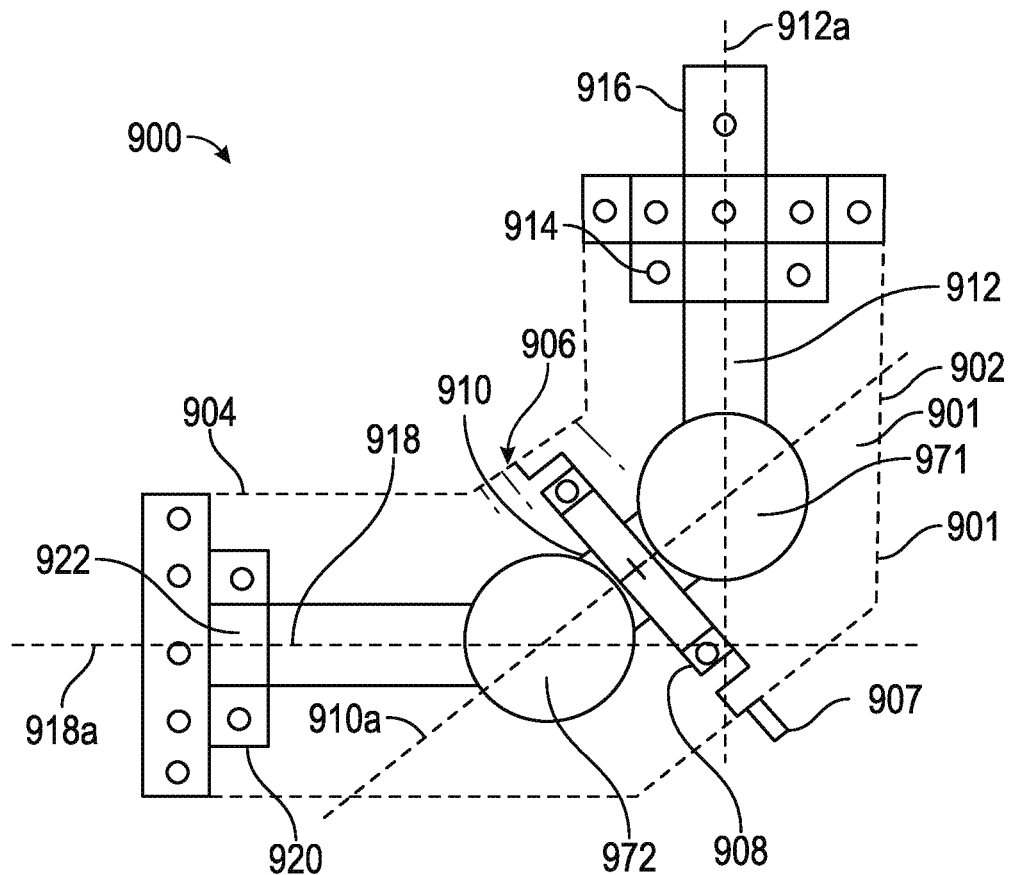
FIG. 14 shows a rotatable mechanical joint housing in a first position.
Figure 15:
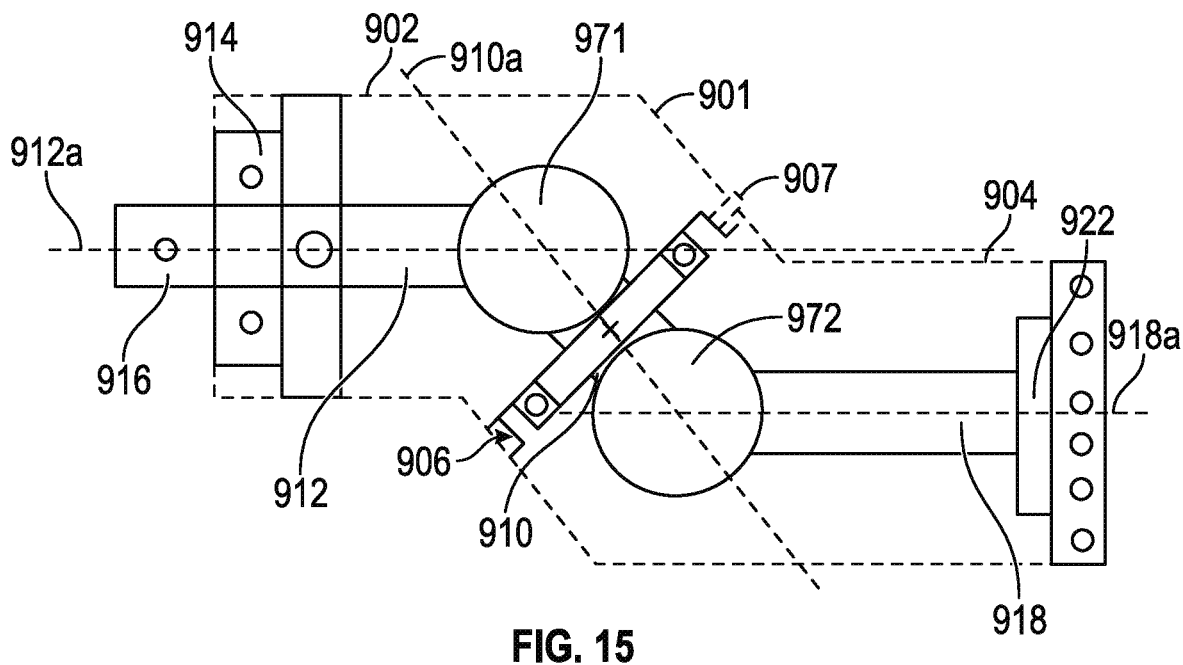
FIG. 15 shows the rotatable mechanical joint housing in a second position.
Figure 16:
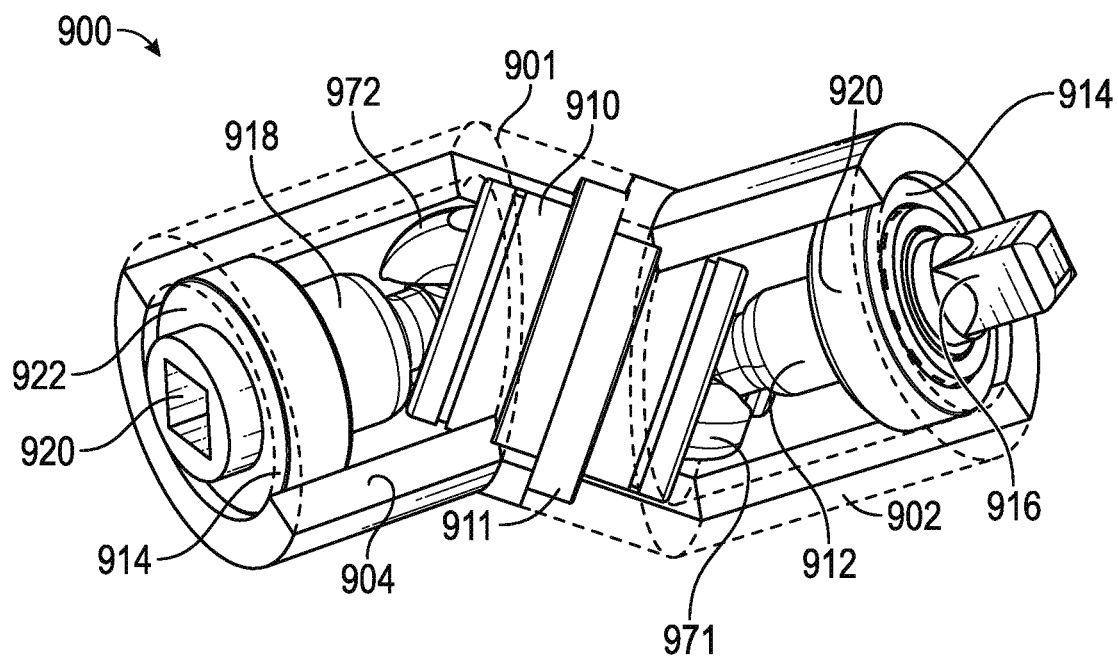
FIG. 16 shows a perspective view of the rotatable mechanical joint housing.

FIGS. 14-16 show a rotatably joint housing embodiment 900. The housing 900 can include first and second segments 902, 904 of a housing 901. The first and second segments 902, 904 can be coupled together at a rotational joint 906. The rotational joint 906 can include a bearing 911. A mechanical joint 910 can be housed within the housing 900. The mechanical joint 910 can be any of the above 90-degree embodiments (e.g., 400, 600). The joint 910 can include an inner housing rotatable about an axis 910a within the housing 901. A first shaft 912 can extend through the first segment 902 and pivotably coupled with a first drive puck 971 of the joint 910. The first shaft can rotate about an axis 912a. A second shaft 918, rotatable about axis 918a, can extend in the second segment 904 an pivotably couple with a second drive puck 972. The first and second drive pucks 971, 972 can each be pivotable with respect to the inner housing of the joint 910. An outer end 916 of the first drive shaft 912 can include an attachment mechanism (e.g., a standard male socket). The drive shaft 912 can be stabilized by a bearing 914. The second drive shaft 918 can extend within the second segment 904 and can be stabilized by a second bearing 920. An outer end 922 of the second drive shaft 918 can include an attachment mechanism (e.g., a female socket connector).

The rotation interface 906 can generally include a tongue and groove structure between the first and second segments 902, 904. The first and second segments 902, 904 can be rotated with respect to each other along the rotation interface 906 about the axis 910a. FIG. 14 illustrates the first and second segments 902, 904 in a first configuration. FIGS. 15-16 illustrates the first and second segments 902, 904 in a second configuration. The rotation mechanism 906 can extend around a center or central portion of the mechanical joint 910.

The rotation mechanism 906 can optionally include a pin 907 and a plurality of circumferential apertures 908 through the rotation mechanism 906 for locking the position between the first and second segments 902, 904 by insertion of the pin 907. The connection between the first and second segments 902, 904 can be by any conventional manner, such as spring clips, groove-and-dowel, or internally interlocking groove structures.

FIGS. 17-20 show an adjustable-angle housing 2000. The housing 2000 includes first and second segments 2002, 2004 of a housing 2001. The first and second segments 2002, 2004 can pivotably attach at an interface 2006. The adjustable housing 2000 includes a mechanical joint 2010 having an inner housing pivotably coupled with drive puck 2071, 2072. The drive puck 2071, 2072 can be pivotably coupled with rotatable shafts 2012, 2018. The rotatable shafts 2012, 2018 can rotate about axes 2012a, 2018a. The inner housing can rotate about axis 2010a. The rotatable shafts 2012, 2018 can coupled with outputs 2016, 2020 (e.g., male and female sockets). The mechanical joint 2010 can be any of the above 90-degree joints (e.g., 400, 600).

The adjustable housing 2000 adjusts the angle between the first and second rotatable shafts 2012, 2018 between approximately zero degrees and approximately 90 degrees. Inner ends of the first and second segments 2002, 2004 can be hinged together by one or more flanges 2032 and 2034. A pins 2034, 2036 can extend through the flanges 2032, 2034 to couple together the first and second housing segments 2002, 2004 along a single pivot location 2006a. A dial 2030 can optionally be attached at one end of the pin 2036. The pin 2036 can tighten or loosen to allow rotation between the first and second housing segments 2002, 2004 about the pin 2036. This adjust allows adjustment of the angle between the first and second drive shafts 2012, 2018 (e.g., between 0 and 90 degrees).

The first and second housing segments 2002, 2004 can include one or more bearings for stabilizing rotation of first and second drive shafts 2012, 2018. The first and second drive shafts 2012, 2018 can optionally include attachment mechanism (e.g., male or female socket adapters).

Figure 17:
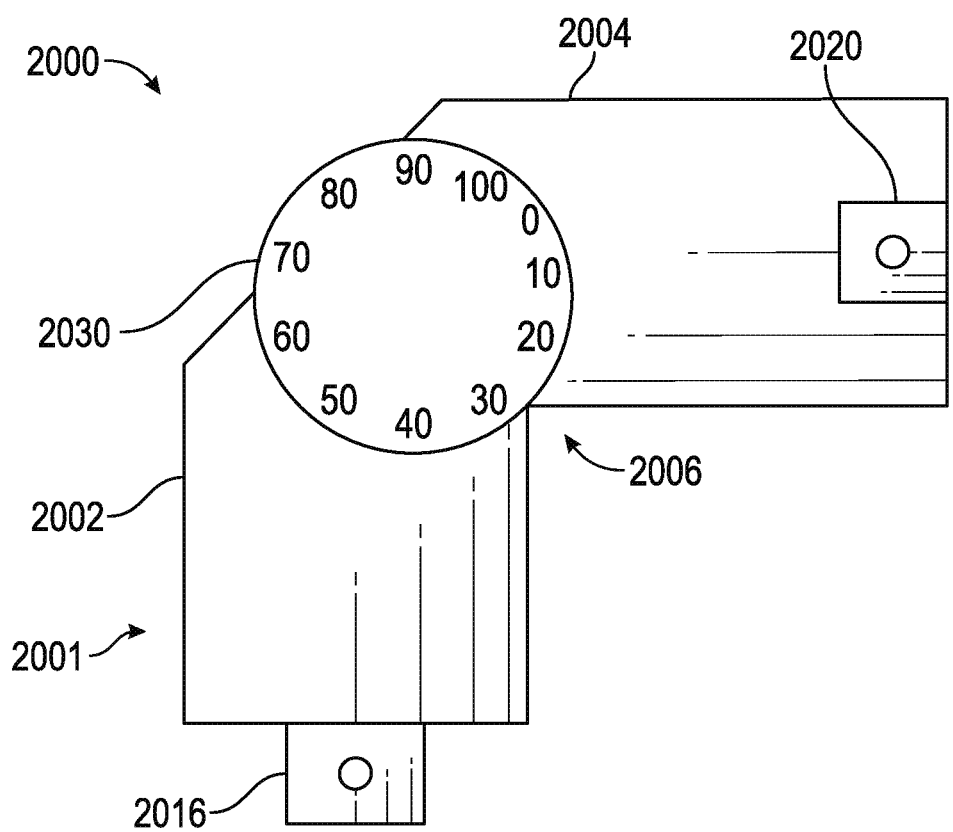
FIG. 17 shows an angle-adjustment mechanical joint housing.
Figure 18:
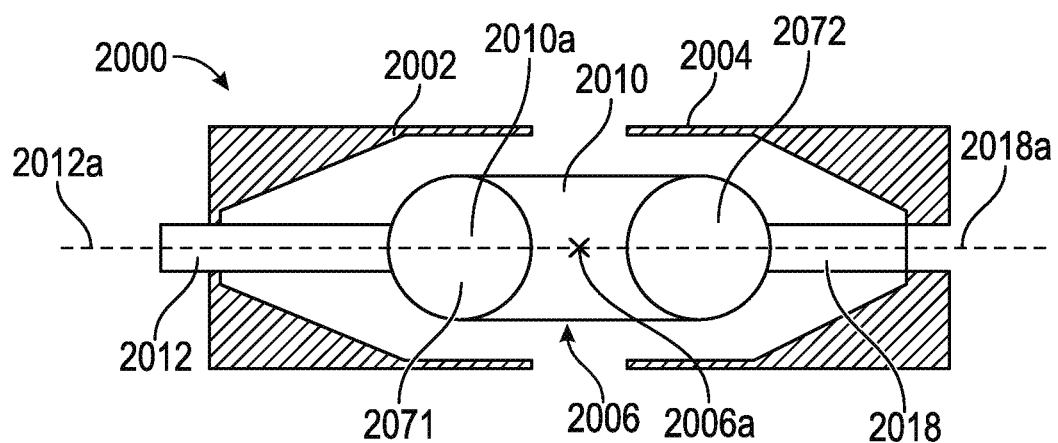
FIG. 18 shows a cross-section of the angle-adjustment mechanical joint housing in a first position.
Figure 19:
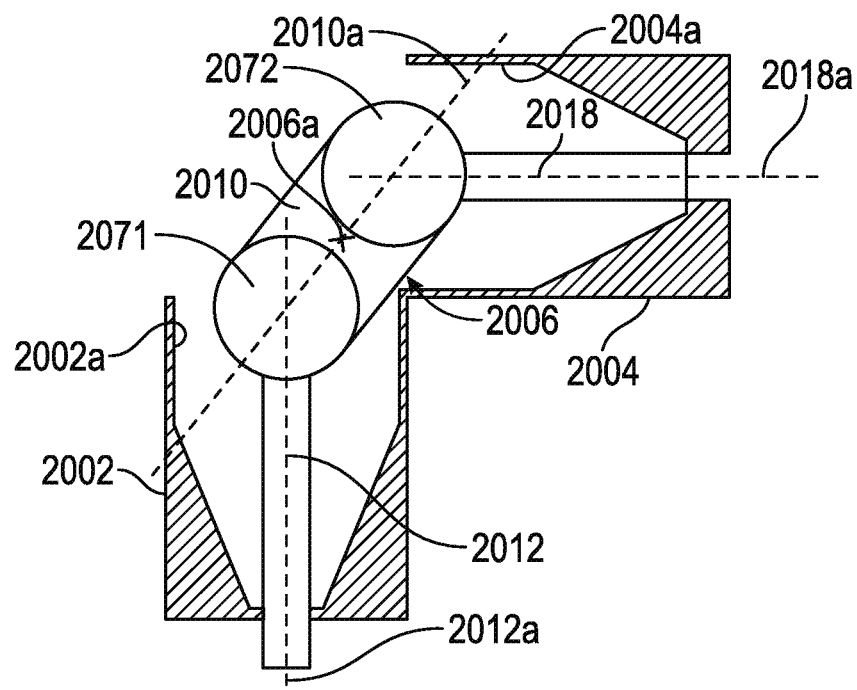
FIG. 19 shows a cross-section of the angle-adjustment mechanical joint housing in a second position.
Figure 20:
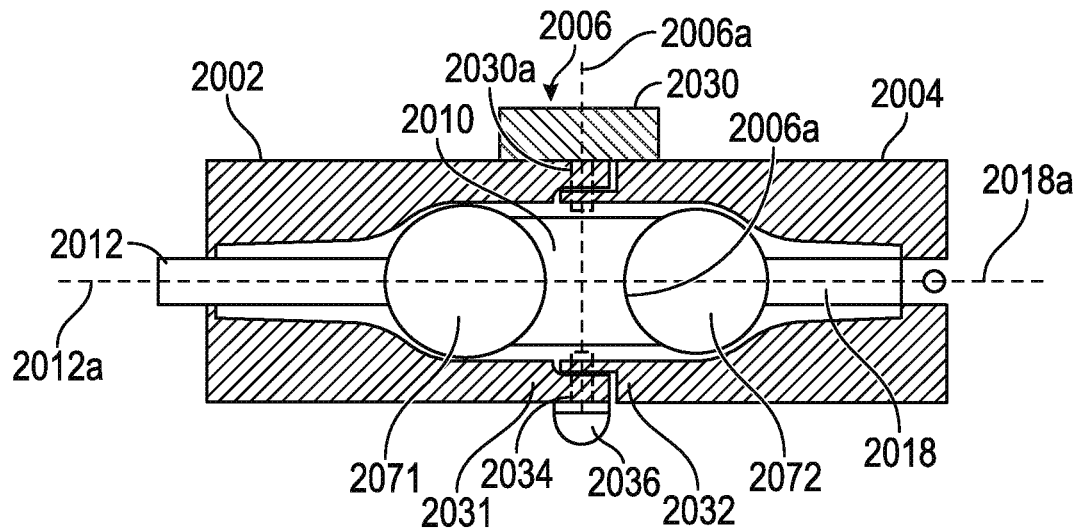
FIG. 20 shows an orthogonal cross-section of the angle-adjustment mechanical joint housing in the first position.

FIGS. 17 and 19 show the adjustable housing 2000 in a 90-degree configuration. FIGS. 18 and 20 show the adjustable housing 2000 in a zero degree configuration (e.g., aligned housing segments 2002, 2004). Any angle therebetween is an available configuration of the adjustable housing 2000.

As the housing 2000 is transitioned between the 0 degree configuration and the 90 degree configuration, the position of the inner housing of the joint 2010 adjusts position within the housing 2000. In the 90-degree positon, the shafts 2012, 2018 can be misaligned with the first or second housing segments 2002, 2004. Thus, an interior cavity 2002a, 2004a of the housing 2000 can be enlarged to accommodate movement of the joint 2010 between the various angles. In certain implementations, the joint 2010 can contact an inner side of the housing 2001.

Figure 21:
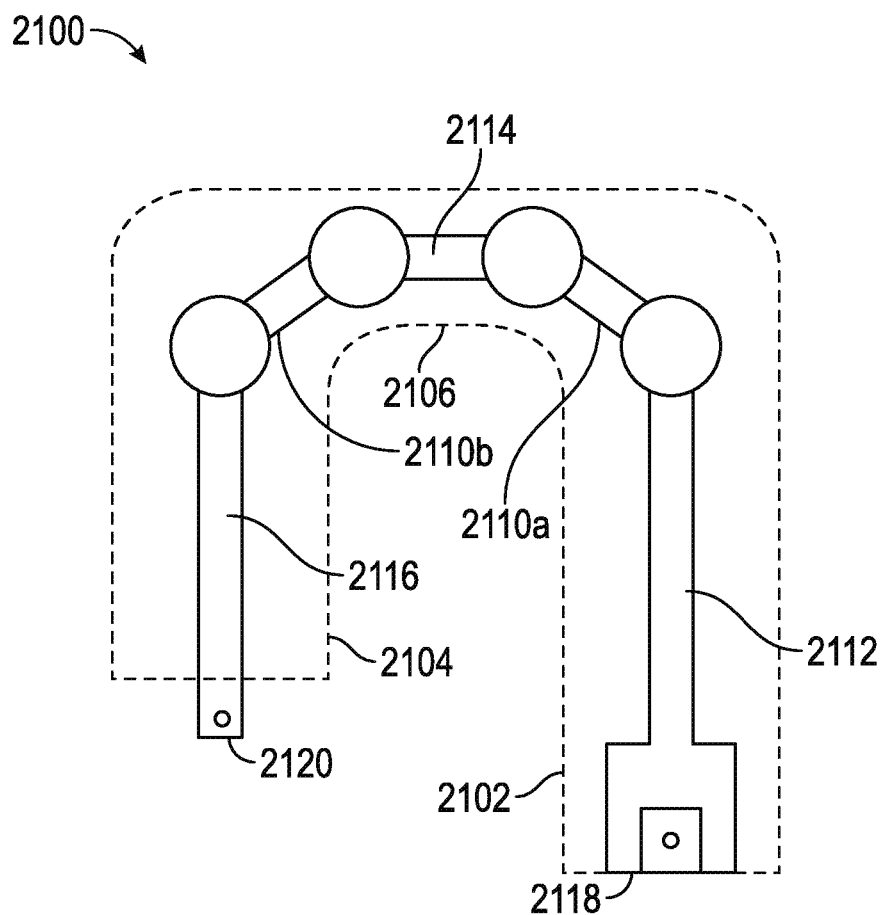
FIG. 21 shows a second fixed mechanical joint housing.
Figure 22:
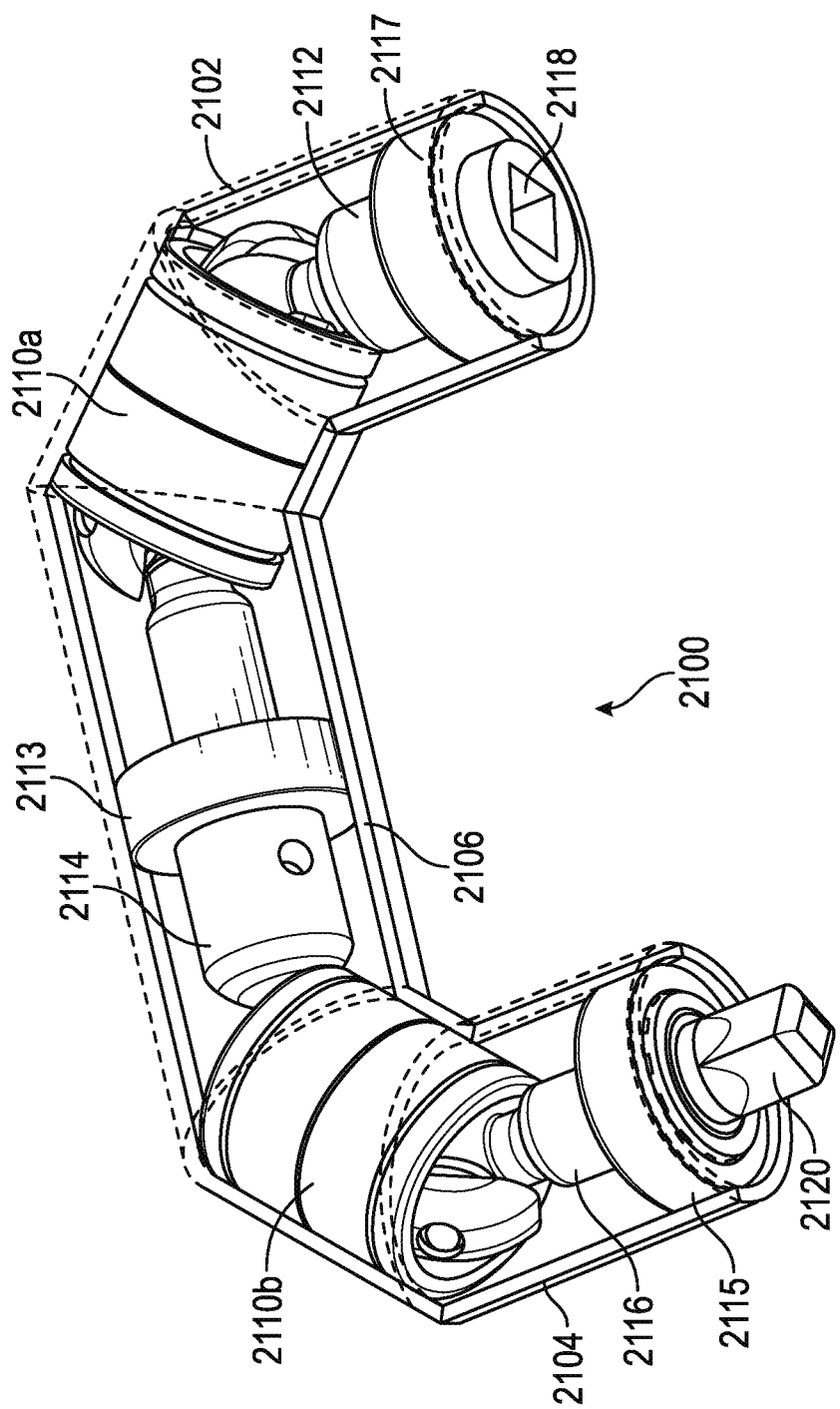
FIG. 22 shows a perspective view of the second fixed mechanical joint housing.

FIGS. 21-22 show another joint housing 2100. The housing 2100 can include two or more mechanical joints 2110a, 2110b. The joints 2110a, 2110b can be any of the above-described joints including 45-degree and 90-degree joints (e.g., 300, 400, 500, 600). The housing 2100 can include a first extension 2102 and a second extension 2104 and an intermediate extension 2106. The first, second, or third extensions can be comprised of one or more straight portions of the housing 2100.

An input shaft 2012 can couple with the first mechanical joint 2110a through the first extension 2102. An intermediate shaft 2114 can couple between the first mechanical joint 2110a and the second mechanical joint 2110b through the third extension 2106. An output shaft 2016 can extend from the other end of the second joint 2110b through the second extension 2104. The input drive shaft 2012 can include an attachment mechanism 2118 (e.g., socket adapter). The output drive shaft 2016 can include an attachment mechanism 2120. The housing 2100 can include one or more bearings 2113, 2115, 2117. Any of the bearings can be thrust bearings.

The first, second and/or intermediate extensions can include one or more bearings (not shown) for stabilizing the shafts extending through extensions of the housing 2100. Between the input shaft 2112 and the output shaft 2116, the housing 2100 can undergo a rotation between 0 and 180 degrees. The housing 2100 can thus provide access for applying a torque through the housing 2100 in hard-to-reach locations (e.g., can include sockets for use in engine of a vehicles or airplane).

Figure 23:
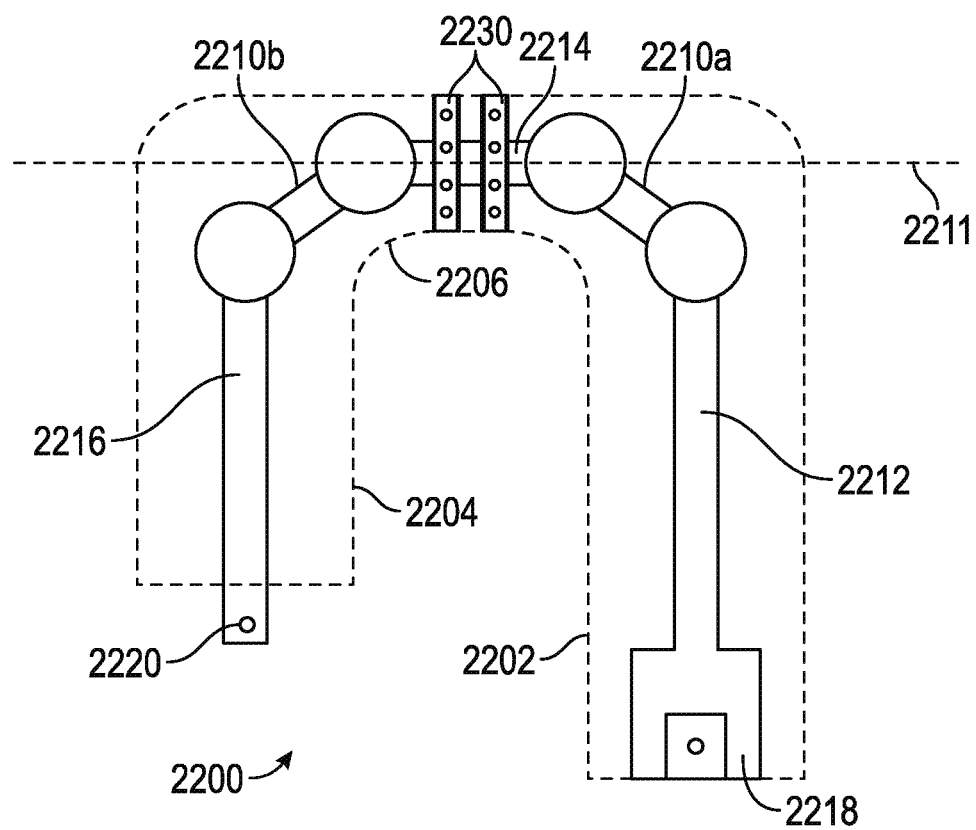
FIG. 23 shows a second rotatable mechanical joint housing.
Figure 24:
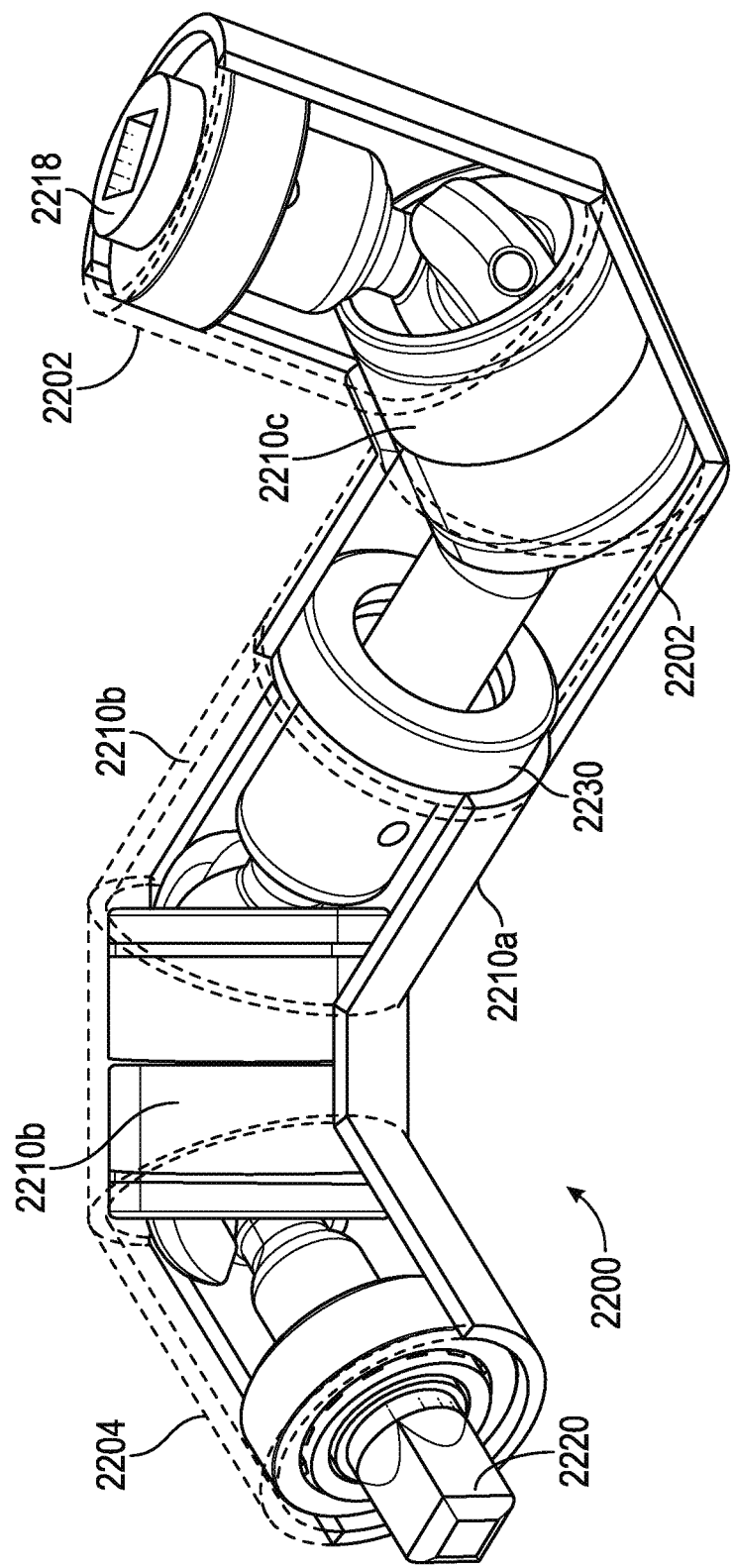
FIG. 24 shows a perspective view of the second rotatable mechanical joint housing.

FIGS. 23-24 show another adjustable joint housing 2200. The joint housing 2200 can include a first shaft 2212, a first end 2218, a first joint 2210a, an intermediate shaft 2214 rotatable about axis 2211, a second joint 2210b, a second shaft 2216, and a second end 2220. The housing 2200 can have the same or similar construction as the housing 2100 with the addition of a rotation or angle-adjustment mechanism 2130. The housing 2200 The rotation mechanism 2130 can allow for rotation between a first portion 2202 and a second portion 2204 of the housing 2200. The rotation mechanism 2230 can be on an intermediate portion 2206. The rotation mechanism 2230 can be similar to either the hinge 2036 and dial 2030 of the adjustable housing 2000.

Figure 25:
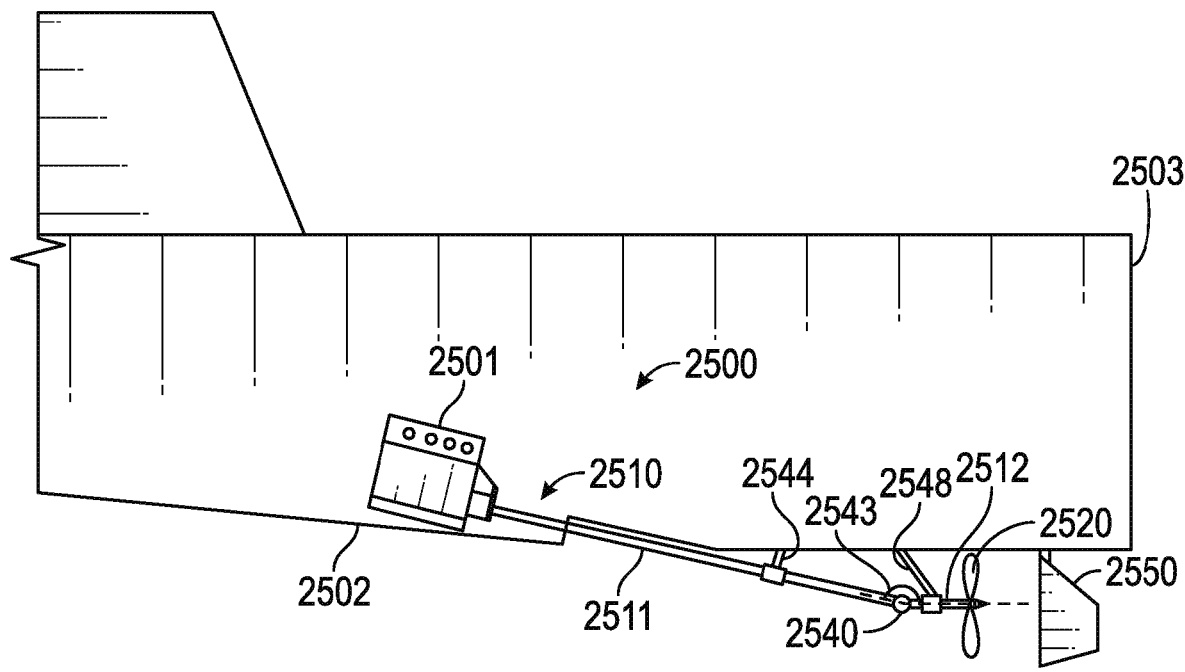
FIG. 25 shows an inboard marine drive including a mechanical joint.
Figure 26:
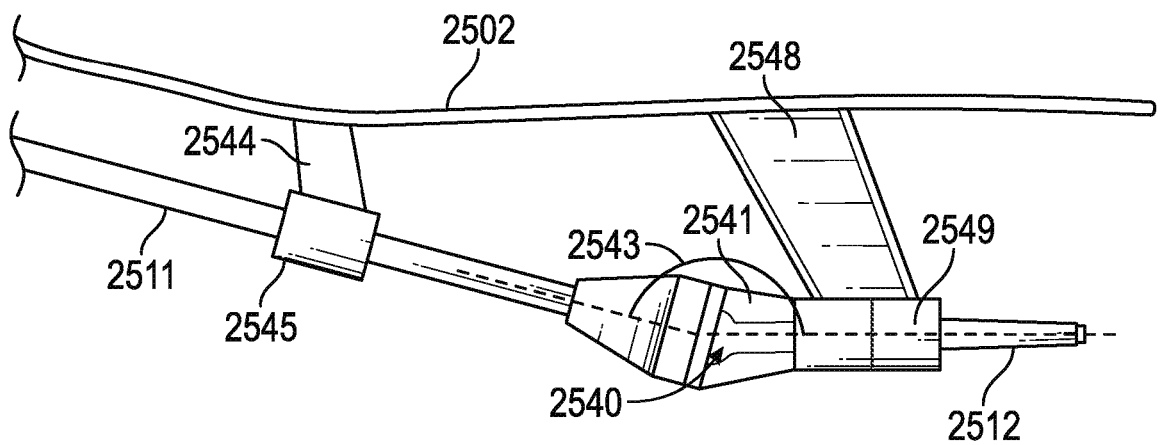
FIG. 26 shows a detail of the inboard marine drive.

FIGS. 25-26 show an inboard marine drive 2500 for a boat. The inboard marine drive 2500 can include an engine 2501 within a hull 2502 with a drive shaft assembly 2510 extending therefrom. The hull 2502 can include a transom 2503. The marine drive 2500 can include an intermediary transmission (not shown) connecting with the drive shaft assembly 2510. The boat can further include a rudder 2550.

The drive shaft 2510 can couple with a propeller or propeller 2520. The propeller 2520 can provide propulsion to the boat as powered by the engine 2501. The drive shaft 2510 can extend from an interior portion of the boat to an exterior portion of the boat through the hull 2502. A standard inboard marine drive includes a straight drive shaft that extends through the hull 2502 at an angle, leaving the propeller 2520 angled with respect to the direction of travel of the boat.

One aspect of the innovation according to the present disclosure is correction of the angled prop. The drive shaft 2510 can include a mechanical joint 2540 between the propeller 2520 and the engine 2501. The mechanical joint 2540 can be any of the mechanical joints described above (e.g., joints 300, 400, 500, 600). The drive shaft 2510 can include a first shaft 2511 and the second shaft 2512. The first shaft 2511 can extend through the hull 2502. The second shaft 2512 can attach with the propeller 2520. The mechanical joint 2540 connect the first and second shafts at an angle 2543. The angle 2543 can be adjusted to positon the propeller 2520 (e.g., can be parallel with the direction of travel or other configuration).

The angle created between the first and second shafts 2511, 2512 can be supported by a first strut 2544 and/or a second strut 2548. The first strut 2544 couples with the first drive shaft 2511 and the hull 2502 or other fixed structure of the boat. The second strut 2548 can couple with the second drive shaft 2512 and the hull 2502 or another fixed structure of the boat. This can support the angle between the first and second shafts 2511, 2512 about the mechanical joint 2540.

The first strut 2544 can include a mount 2545 that couples with the first drive shaft 2511. The mount 2545 can include one or more bearings (e.g., thrust bearings) for facilitating rotation of the drive shaft 2511 and/or transferring propulsion forces from the propeller 2520 to the boat. Similarly, the second strut 2548 can include a mounting portion 2549 that can also option include one or more bearings (e.g., thrust bearings) for supporting the second drive shaft portion 2512 and/or transferring propulsion forces. The joint 2540 can be load bearing and transferring the propulsion forces therethrough.

The mechanical joint 2540 can include a boot 2541. A boot 2541 can prevent debris from entering the joint 2540 or it coming into contact with objects in the water. In one implementation, the boot 2541 and/or a housing or coupling of the joint 2540 can include one or more apertures for drawing water through the mechanisms and housings of the joint 2540 to provide cooling thereto.

Figure 27:
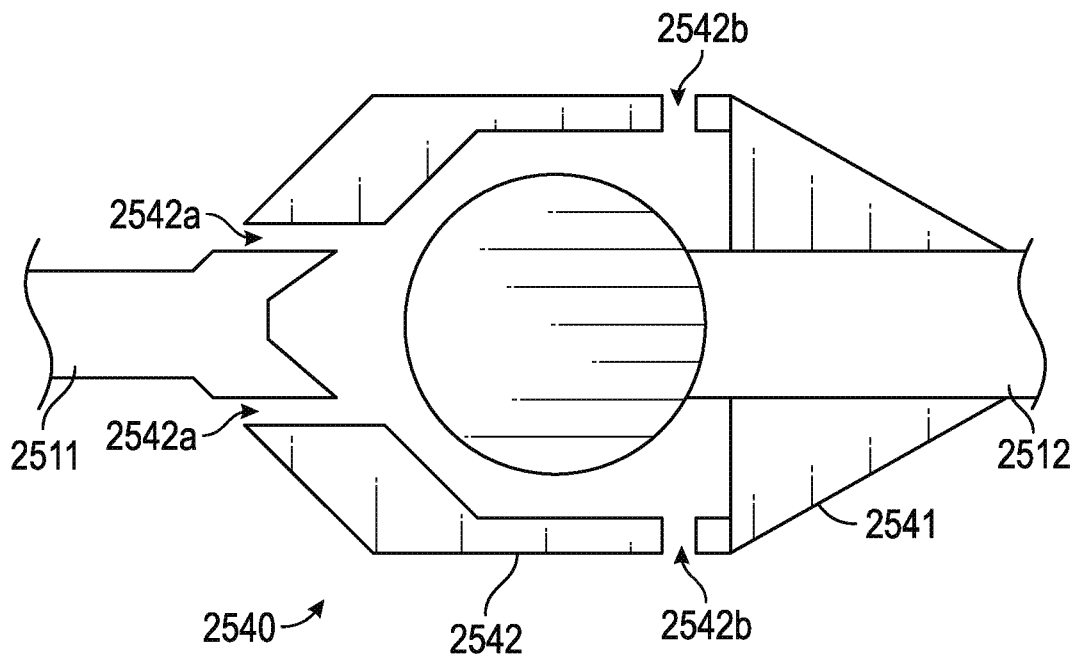
FIG. 27 shows a mechanical joint configured for drawing water through a housing thereof.

FIG. 27 shows further detail of an embodiment of the joint 2540 or joint 2640a. The joint 2540 can include an outer housing element 2542. The housing 2542 can include at least one radially inward aperture 2542a and at least one radially outward aperture 2542b. The aperture 2542a,b can be connected by an inner space of the housing 2542. The rotation of the joint 2540 can cause a lower pressure region at the outward apertures 2542b relative to the inward aperture 2542a. This effect can draw water through the housing 2542 and cool and/or lubricate the joint 2540.

The joint 2540a/2640a,b can including a simple pump mechanism for drawing through the housing. In this implementation, one aperture for drawing water in is located closer to the axis of rotation and a second aperture with a communicative path there between is located at a second location of the housing that is farther from the axis of rotation. The aperture that is farther from the axis of rotation will have a lower pressure which will naturally draw water through the housing from the first aperture to the second aperture.

Figure 28:
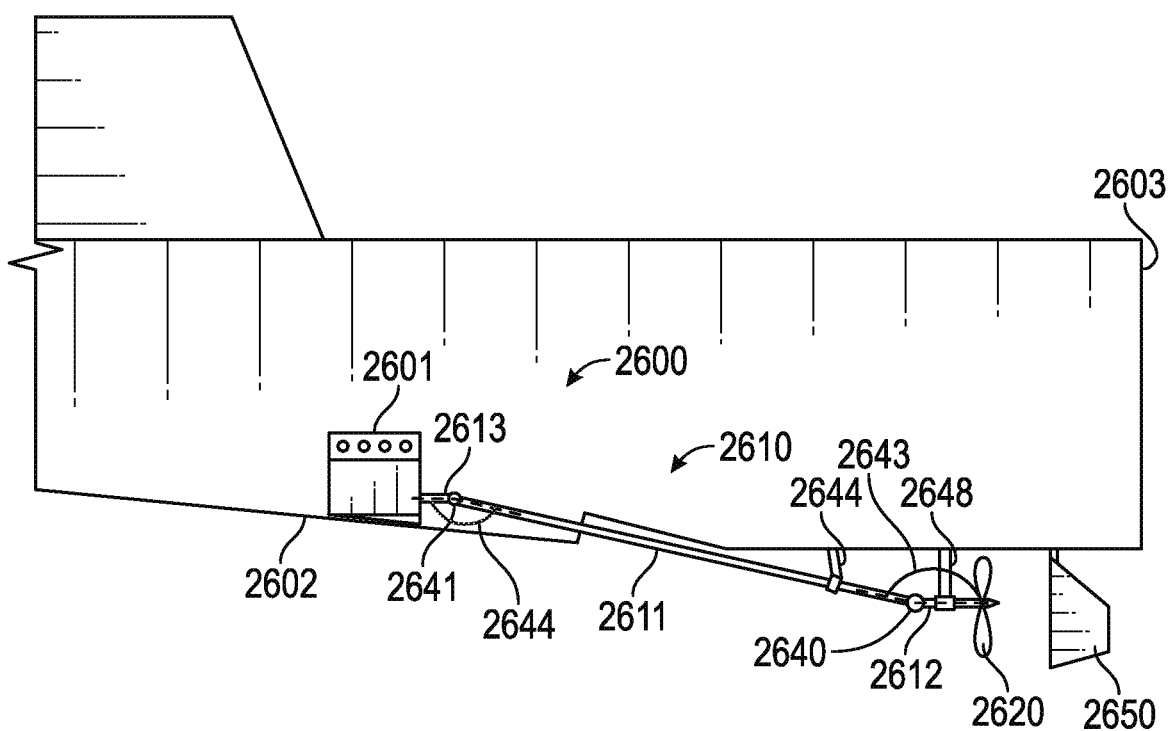
FIG. 28 shows an inboard marine drive including two mechanical joints.

FIG. 28 illustrates another implementation of an inboard marine drive 2600. The inboard marine drive 2600 can include an engine 2601 with a drive shaft 2610. The drive shaft 2610 can extend through a hull 2602. The hull 2602 can include a transom 2603. A rudder 2650 can be used to steer the boat. The rudder can be aft of the propeller 2620.

The drive shaft 2610 can include a first drive shaft 2611 coupled with a second drive shaft 2612 through a first mechanical joint 2640. The propeller 2620 couples with the second drive shaft 2612. A strut 2648 couples with the shaft 2612. The first shaft 2611 can be at an angle 2643 with the second shaft 2612. The second shaft 2612 can be aligned with a direction of travel of the boat. A strut 2647 couples with the shaft 2611. A third shaft 2613 of the drive shaft 2610 can couple with the first shaft 2611 through a second mechanical joint 2641. The third shaft 2613 can extend from the transmission or engine 2601 (e.g., the crankshaft). The third shaft 2613 can be at an angle 2644 with the first shaft 2611. The angles 2643, 2644 can advantageously be the same. This can allow for improved rotation of the drive shaft 2610. The joint 2641, 2640 can be phased (as described above in relation to the joints 400, 600) such that there is constant velocity from the third shaft 2613 to the second shaft 2612.

Figure 29:
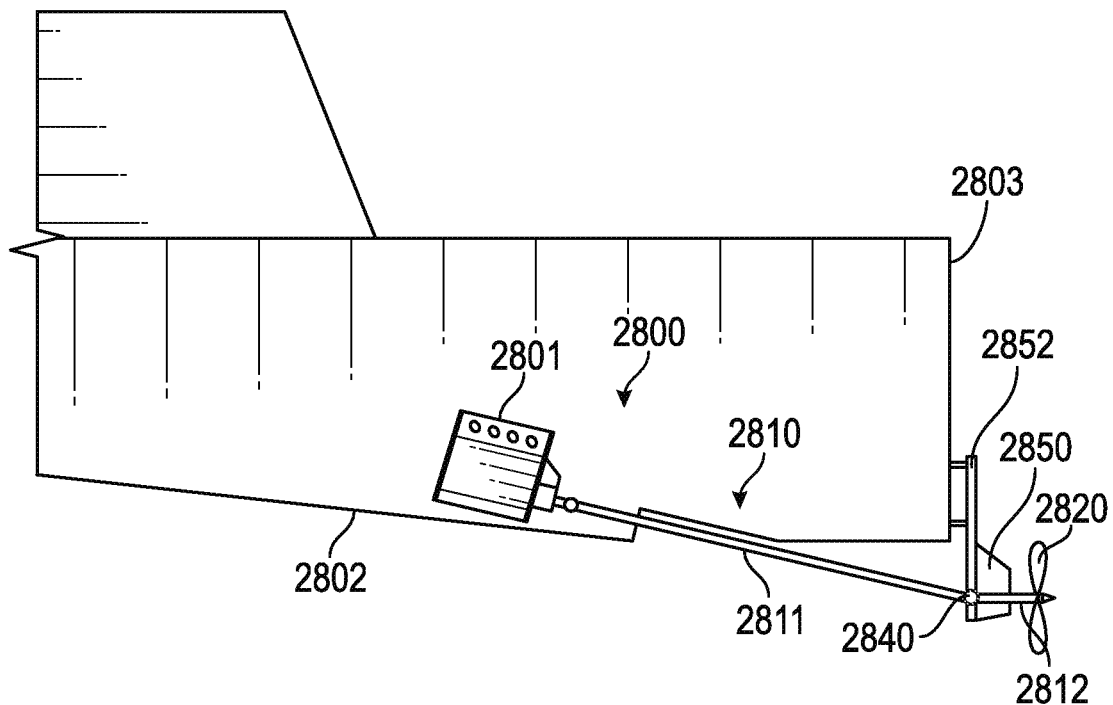
FIG. 29 shows an inboard marine drive including a steerable rudder using a mechanical joint.

FIG. 29 illustrates another embodiment of an inboard marine drive 2800. The marine drive 2800 can include an engine 2801 and a drive shaft 2810 extending through a hull 2802 of a boat. The hull 2802 can include a transom 2803. The drive train 2810 can include one or more mechanical joints 2840. The joints 2840 can be any of the above-described mechanical joints. The drive train 2810 can include a first shaft 2811 and a second shaft 2812 coupled together by the mechanical joint 2840. The angle of the second joint 2812 can correct an angle of a propeller 2820 (e.g., so that the second shaft 2812 is generally parallel to the direction of travel of the boat).

The marine drive 2800 can include a steerable rudder 2850. The rudder 2850 can be integrated or coupled with the second drive shaft portion 2812 and/or the mechanical joint 2840. The rudder (and the second drive shaft portion 2812) can be steerable (e.g., left and right) by a steering mechanism 2852. The steering mechanism 2852 can define a pivot axis for the rudder 2850. The shaft 2812 can be steerable with the rudder 2850 such that a direction of the propeller 2850 is adjustable while rotating. The propeller 2820 can be forward or aft of the rudder 2850 along the shaft 2812.

Figure 30:
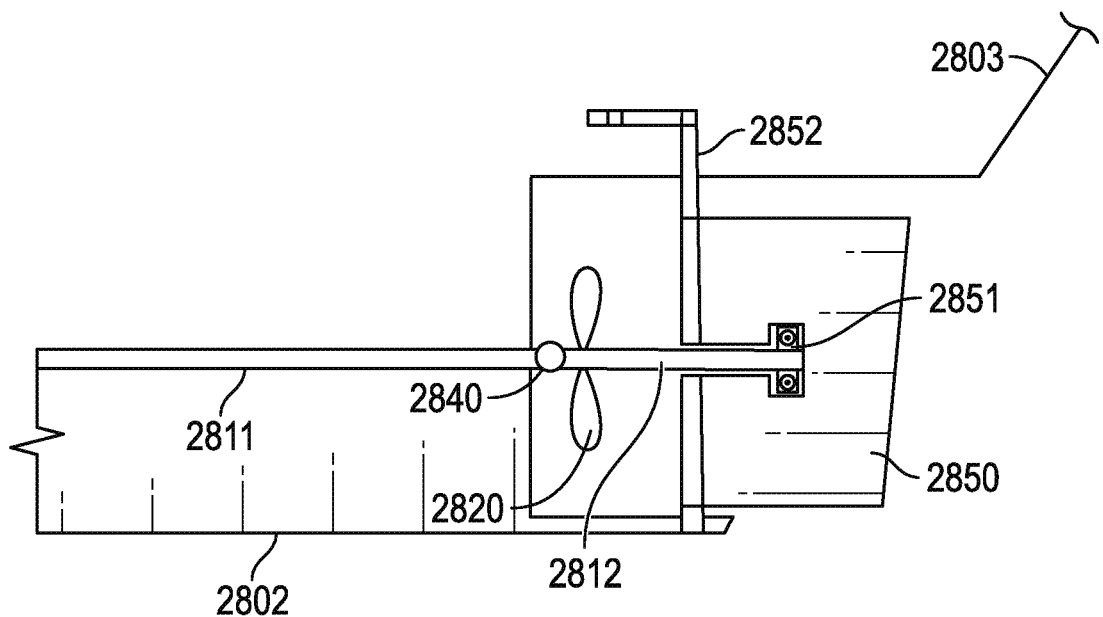
FIG. 30 shows an inboard marine drive including a second steerable rudder coupled with a drive shaft of a propeller.
Figure 31:
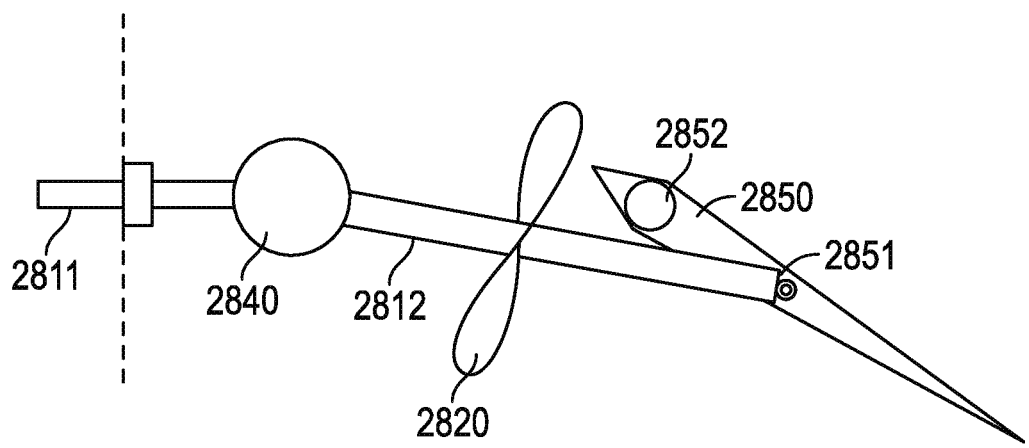
FIG. 31 shows a top-view schematic of the inboard marine drive including the second steerable rudder.
Figure 32:
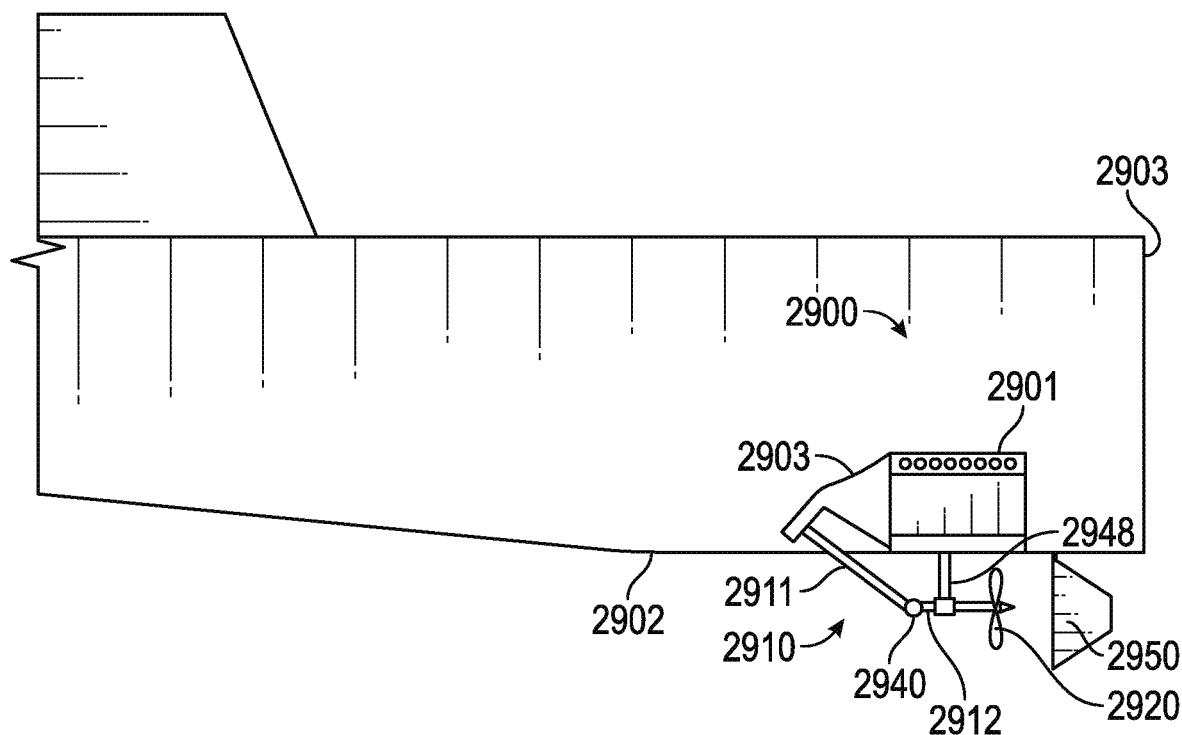
FIG. 32 shows an inboard v-drive marine drive including a mechanical joint.

FIGS. 30-32 further show one implementation of the rudder 2850 coupled with the drive shaft 2812. The steering mechanism 2852 mechanism can include a linkage for supporting a driveshaft extending from a boat. In some implementations, the rudder 2850 can include a bearing 2851 (e.g., ball bearing) and/or seat for a distal end of the second shaft 2812. The bearing 2851 can be gimbaled such that the angle of the rudder affects or modifies the angle of the shaft 2812 in a controlled (e.g., ratioed) manner.

FIG. 32 illustrates another embodiment of an inboard marine drive 2900. Marine drive 2900 can include an engine 2901 with a v-drive transmission 2903 within a hull 2902 of a boat, the hull including a transom 2903. A drive shaft assembly 2910 can include a first shaft 2911 and second shaft 2912 coupled together by a mechanical joint 2940. Mechanical joint 2940 can be any of the above described mechanical joints. The first shaft 2911 can be coupled with the hull 2502 (e.g., by a support bearing) and/or the transmission 2903. The second shaft 2912 can be coupled with the hull or another solid surface of the boat by a strut 2948. The propeller 2920 can be located forward or aft of a rudder 2950.

Figure 33:
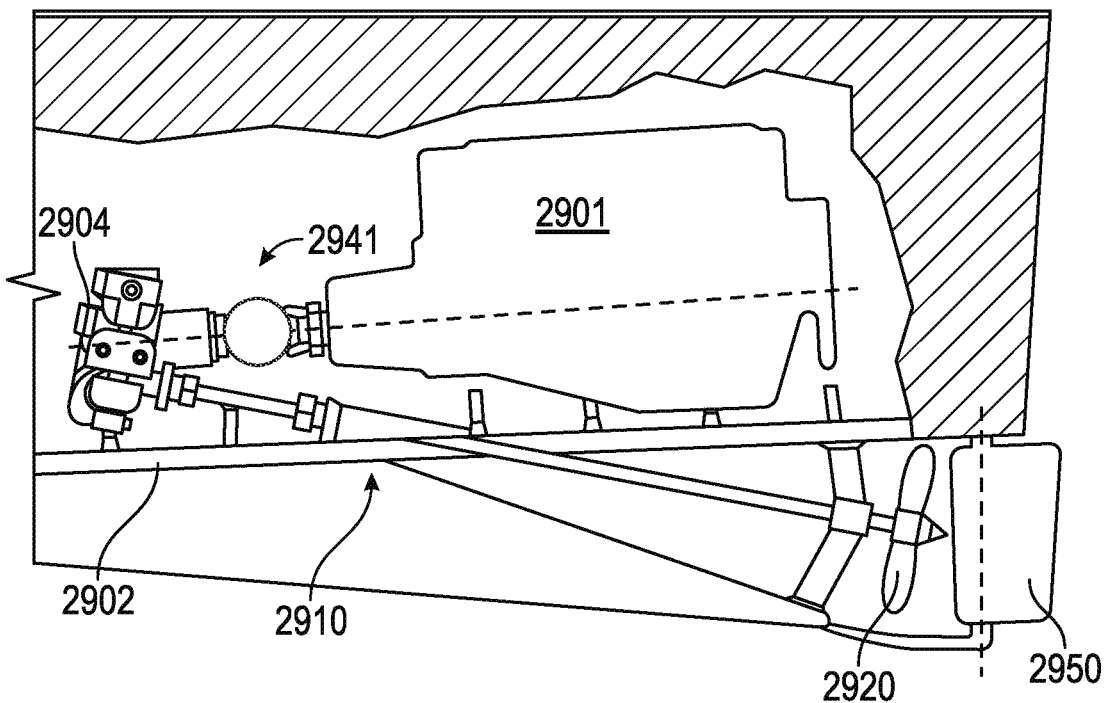
FIG. 33 shows a second inboard v-drive marine drive including a mechanical joint.

FIG. 33 illustrates another application of a mechanical joint 2941. Many conventional v-drives include a flexible coupling between the engine 2901 and the transmission 2904. The flexible coupling can be replace by the mechanical joint 2941 (e.g., any of the above-described joints such as joints 300, 400, 500, 600). The transmission 2904 can be coupled with a drive shaft 2910 that extend through hull 2902 and coupled with a propeller 2920. A steerable rudder 2950 can be used for steering the boat.

Figure 34:
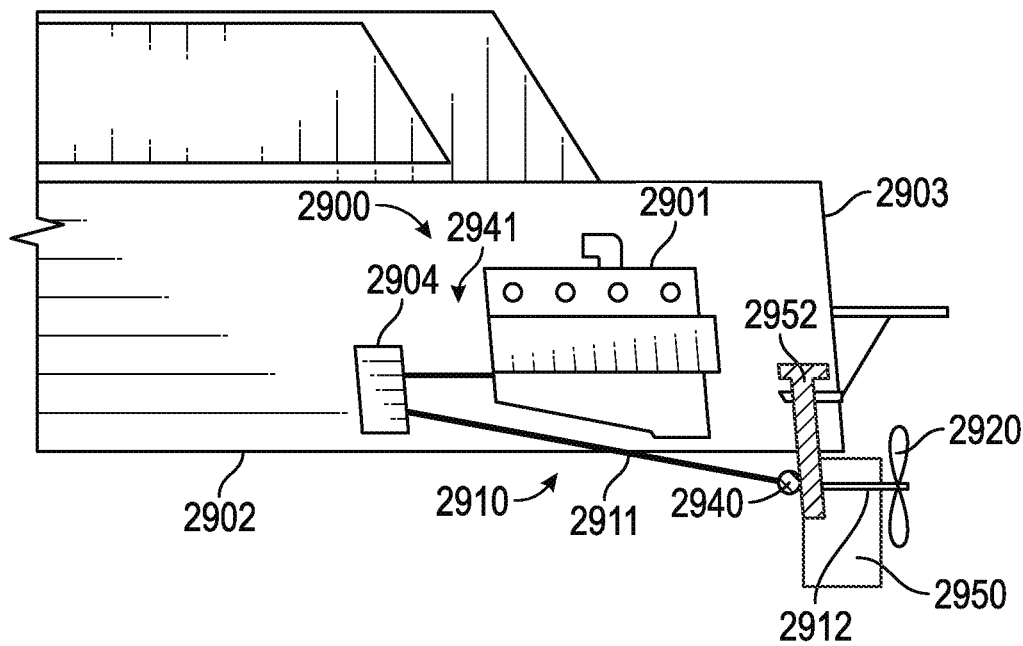
FIG. 34 shows a third inboard v-drive marine drive including a steerable rudder coupled with a drive shaft of a propeller.

FIG. 34 illustrates another setup of the marine 2900 including a steerable rudder assembly 2950. couple with the second drive shaft 2912. The second shaft 2912 can be coupled with the steerable rudder 2950 and pivotable about a steering mechanism 2952.

Figure 35:
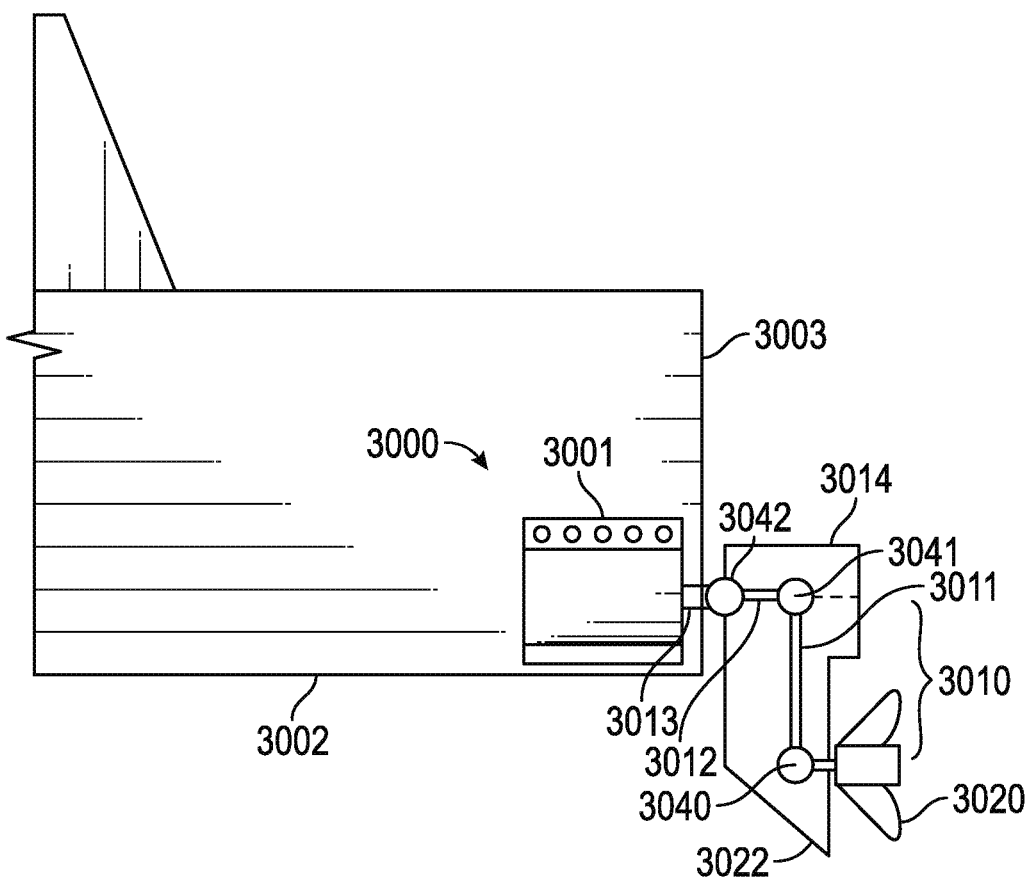
FIG. 35 shows an inboard stern-drive marine drive.
Figure 36:
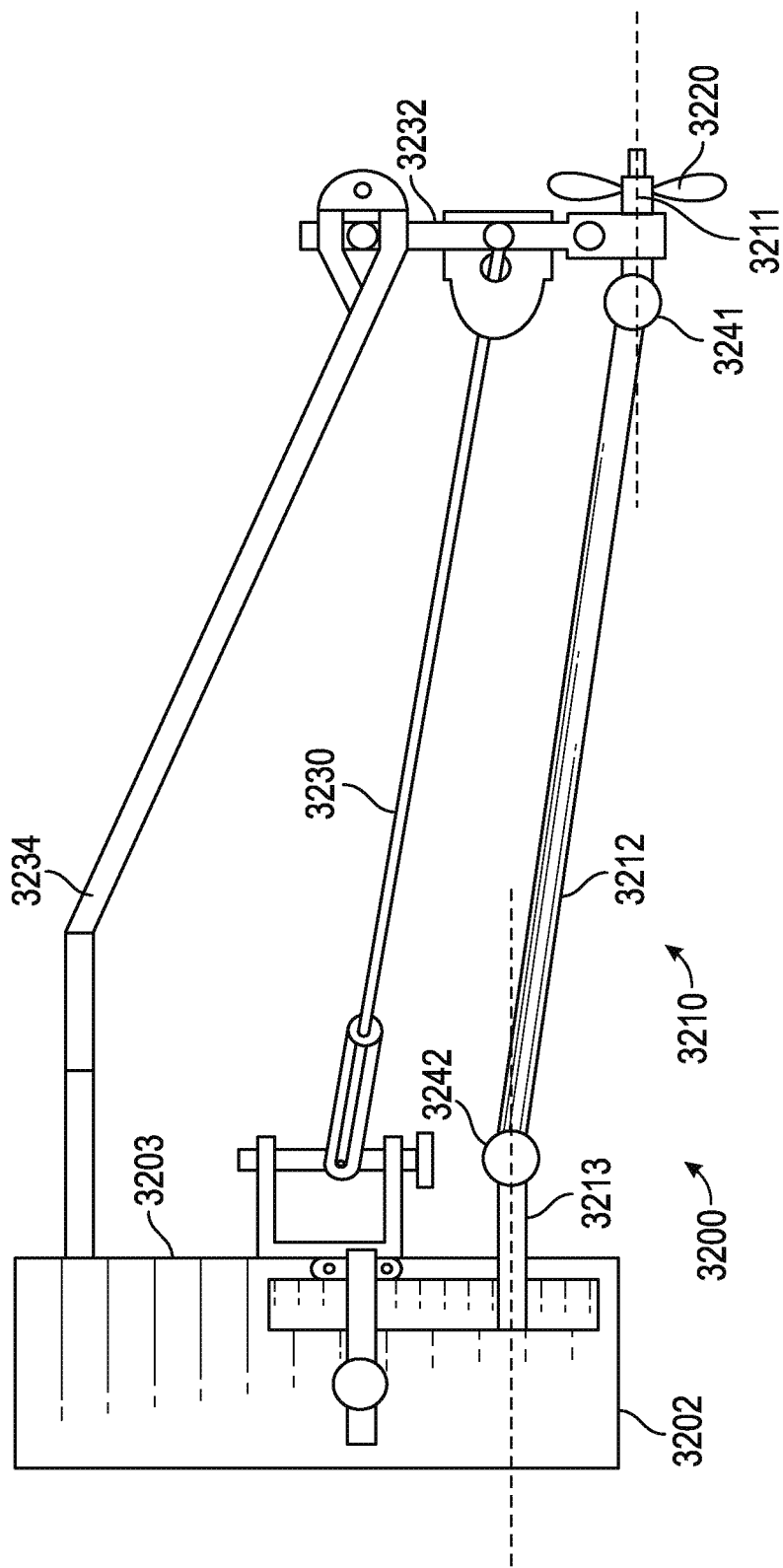
FIG. 36 shows an inboard surface drive including a control arm for positioning a propeller.

FIG. 35 illustrates an embodiment of an inboard stern marine drive 3000. The marine drive 3000 can include an engine 3001 inside of a boat hull 3002 with a transom 3003. A power output shaft and/or transmission transfers rotational torque from the engine 3001 to a drive train 3010. The drive train 3010 can couple with a propeller housing 3014. The propeller housing 3014 can support a propeller 3020 and the drive train 3010 for transferring torque to from the engine to the propeller 3020. The housing 3014 can be steerable with respect to the transom 3003 of the boat (e.g., hydraulically or mechanically) about a first mechanical joint 3042. The mechanical joint 3042 can connect between the housing 3014 and the a first shaft 3013 of the drive train 3010. The mechanical joint 3042 can be any of the mechanical joints described above, in particular the 90-degree joints to allow for steering of the propeller 3020. The mechanical joint 3040 can allow for rotation within two planes of motion for controlling the direction and position of the propeller 3020. The drive train 3010 can further include a second shaft 3012, a second joint 3041, a third shaft 3011 and/or a fourth joint 3040. The second and third joint 3041, 3040 can be used as replacements for conventional bevel gears within the propeller housing 3014.

FIG. 36-41 illustrate an inboard surface marine drive 3200. A drive shaft assembly 3210 extends from a transom 3203 or other portion of the hull 3202 of a boat. Drive shaft 3210 can couple with an engine 3201. Drive shaft 3210 can include first drive shaft portion 3211 rotatably about a first axis and coupled with a propeller 3220, second drive shaft portion 3212, and a third drive shaft portion 3213 rotatable about a second axis. The first and second drive shafts 3211, 3212 can be coupled together by a mechanical joint 3241. The second and third drive shafts 3212, 3213, can be coupled by a mechanical joint 3242. The first and second mechanical joints 3241, 3242 can be any of the above described mechanical joints (e.g., 300, 400, 500, 600).

Figure 37:
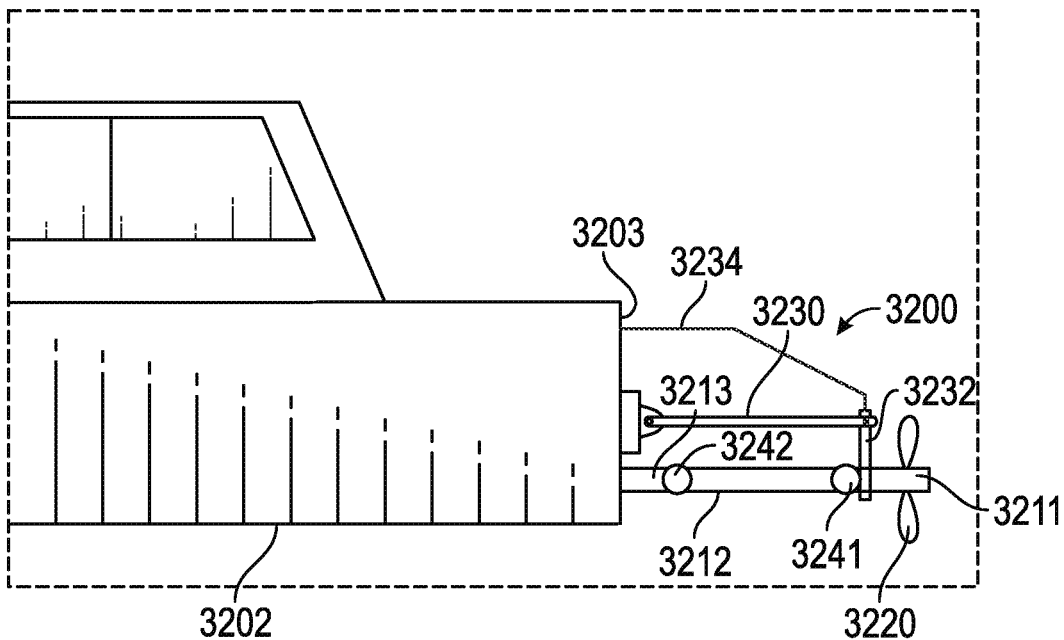
FIG. 37 shows a side-view schematic of the inboard surface drive in a lowered position.
Figure 38:
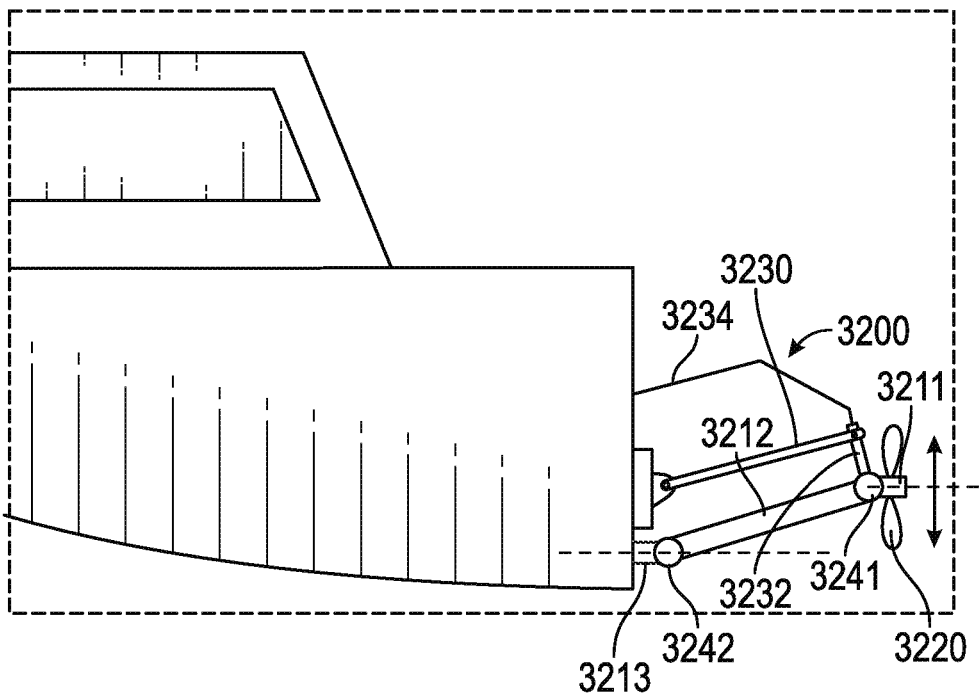
FIG. 38 shows a side-view schematic of the inboard surface drive in a raised position.

A linkage assembly (e.g., four bar or similar mechanism) can support the drive shaft 3210 and the propeller 3220. The propeller 3320 can be supported such that the propeller 3220 remains generally vertical with the axis of the drive shaft 3211 can remaining generally horizontal (e.g., within 10° or 15°). The linkage assembly can include an upper link 3230. A first end of the linkage 3230 can pivotably couple with the hull 3202 and a second end can pivotably couple with a mounting apparatus 3232 coupled with the first drive shaft portion 3211. The linkage 3230 and the second drive shaft 3212 can generally form a four-bar assembly with pivots at the ends of the upper link 3230 and the first and second mechanical joints 3241, 3242. As shown in FIGS. 37-38, the mounting apparatus 3232 can be coupled with a control arm 3234 for raising and lowering the propeller 3220 (e.g., with respect to the water line).

Figure 39:
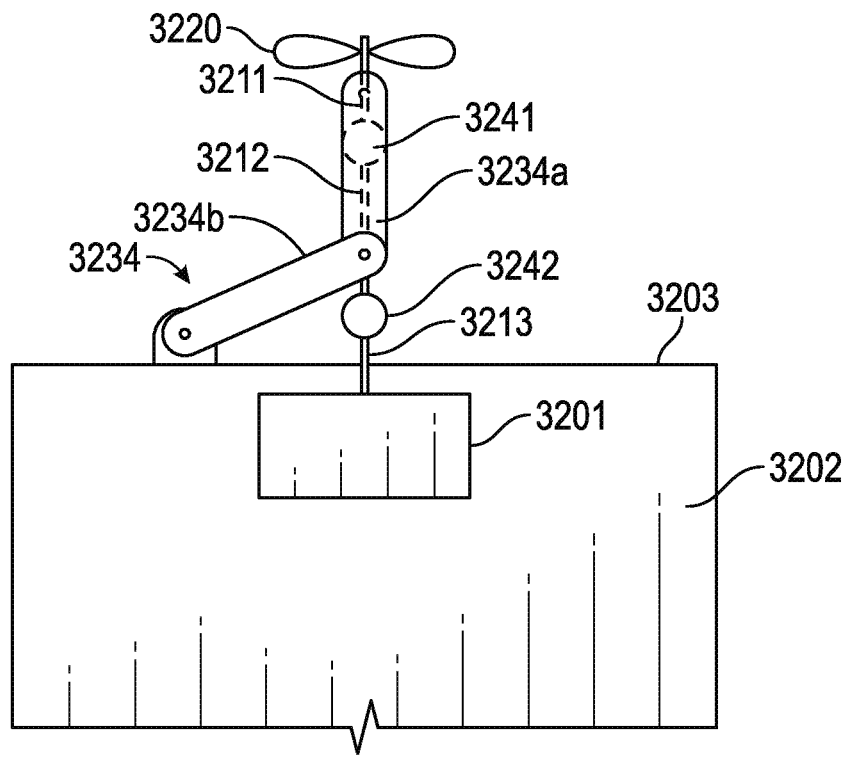
FIG. 39 shows a top-view schematic of the inboard surface drive in a first position.
Figure 40:
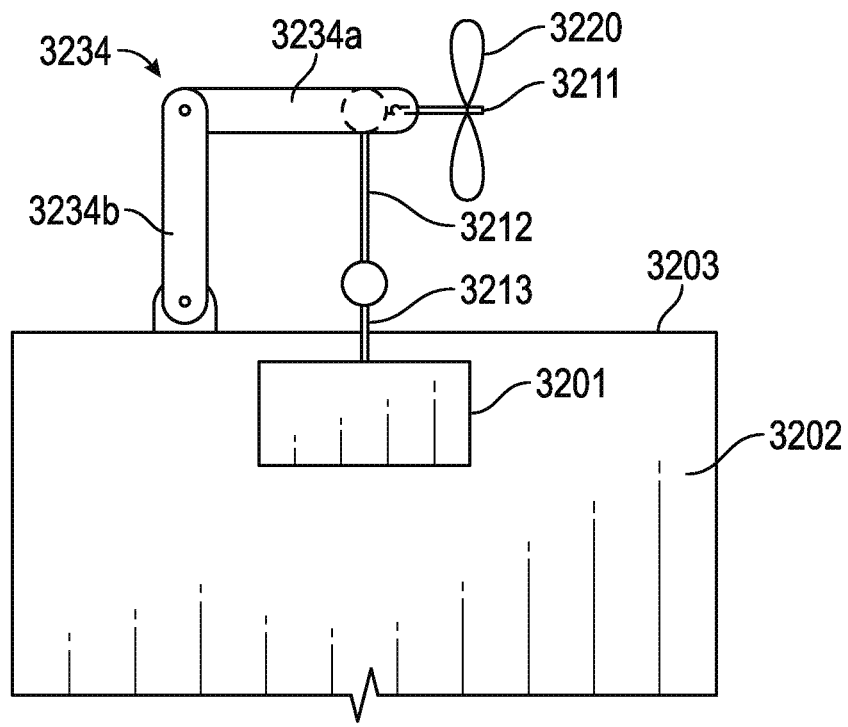
FIG. 40 shows a top-view schematic of the inboard surface drive in a second position.
Figure 41:
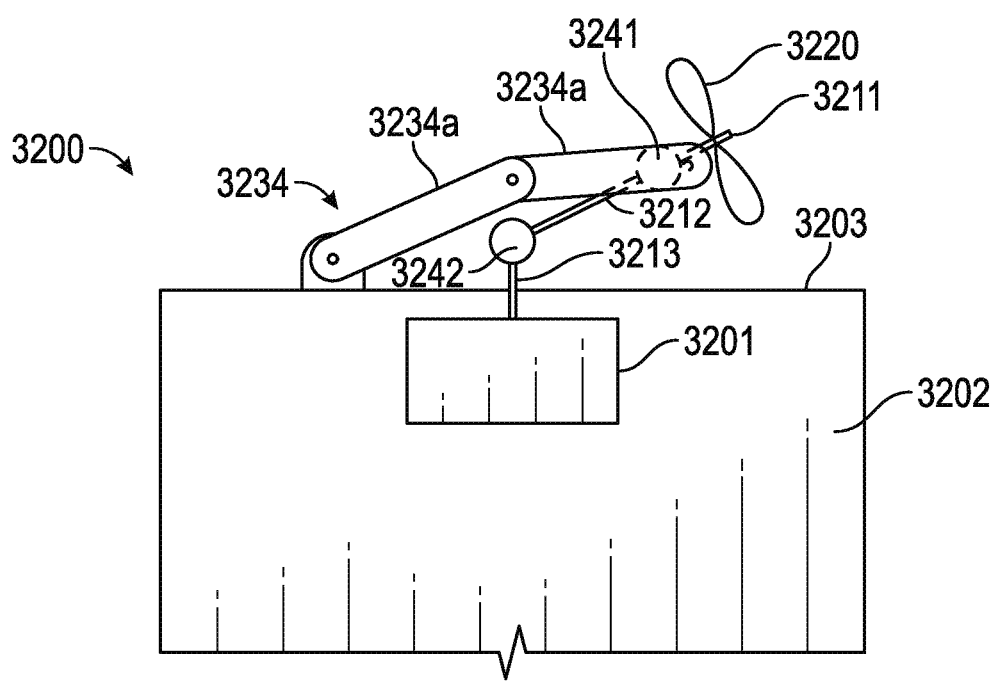
FIG. 41 shows a top-view schematic of the inboard surface drive in a third position.

As shown in FIGS. 39-41, the drive train 3210 can be adjusted to control the direction of the propeller 3220 (e.g., for steering purposes). The control arm 3234 can be coupled with a mechanical actuator or controlled manually. The control arm 3234 can optionally include first and second linkages 3234a, 3234b. The first and second linkages 3234a, 3234b can be pivotably coupled together. The control arm 3234 can be coupled with the first shaft 3211 by the mounting apparatus 3232. Movement of the control arm 3234 (e.g., pivoting and/or sweeping) can orient the first shaft 3211 and the propeller 3220 in the left and right directions. The control arm 3234 can adjust the first shaft 3211 about the first joint 3241 (as shown in FIG. 40) or about the second joint 3242 (as shown in FIG. 41), or both the first and second joints 3241, 3242.

Figure 42:
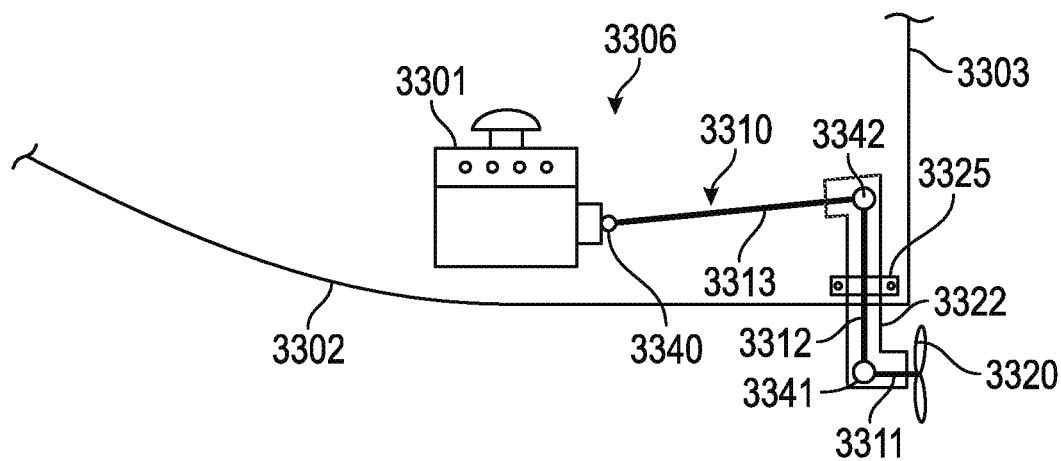
FIG. 42 shows an inboard z-drive marine drive including a mechanical joint.

FIG. 42 shows a z-drive type marine drive 3300. Drive 3300 can include an engine 3301 with a drive shaft assembly 3310. The drive shaft 3310 can extend from an interior portion of a hull 3302 of the boat to an exterior propeller 3320. The drive shaft can include a first shaft 3311 and a second shaft 3312 coupled by a joint 3341. The joint 3341 can be according to any of the above joints (e.g., 300-600). A second joint 3342 can couple with the second shaft 3312 to connect with the propeller 3320. Optionally another joint 3340 can couple with a third shaft 3313. The third shaft 3313 can coupled with a transmission of an engine 3301. A z-drive propeller mount 3322 can extend from the hull 3302 and support the propeller 3320 and the second drive shaft 3312. The propeller mount 3322 can be rotatable about a mount 3325 to steer the propeller 3320 in any direction.

Figure 43:
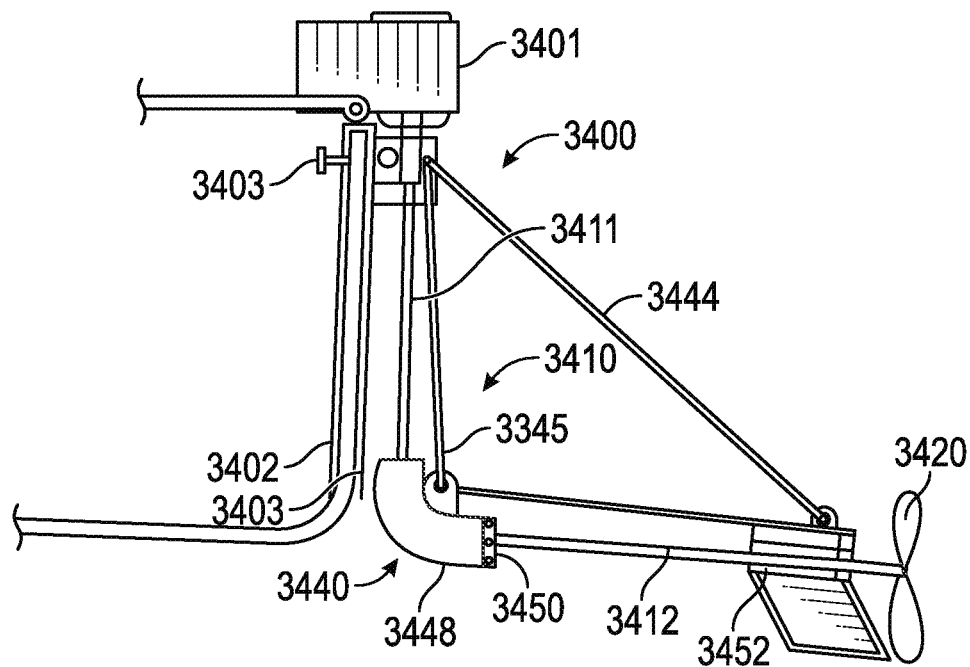
FIG. 43 shows an outboard marine drive including a mechanical joint.

FIG. 43 shows an outboard marine drive 3400. The outboard type marine drive can include an engine 3 that attaches with a transom 3403 of a boat hull 3402. The marine drive 3400 can include a coupler 3404 (e.g., a clamp) for coupling with the transom 3403 in one or more locations. The marine drive 3400 can be steerable about the coupler locations 3404 in the conventional manner of an outboard motor (e.g., manually or hydraulically).

A drive shaft assembly 3410 can extend from the engine 3 to a propeller 3420. The shaft assembly can include a first drive shaft 3411 extending generally vertically, a second drive shaft 3412 extending generally horizontally. The drive shaft 3412 can connect with the propeller 3420. A mechanical joint 3440 can couple between the first and second shafts 3411, 3412. Mechanical joint 3440 can be any of the above-described 90-degree joints (e.g., 400, 600). Support struts 3444, 3445 can couple between an upper portion of the drive shaft 3411 and an outer portion of the drive shaft 3412 to provide support thereto.

The mechanical joint 3440 can include an outer housing 3448. The outer housing 3448 can include one or more bearings for supporting and providing a stable rotating location for the drive shafts 3411, 3412. The mechanical joint housing 3448 can include a thrust bearing 3450 because the propeller 3420 is providing a propulsion to the boat along the second drive shaft 3112 and the joint 3440. The second drive shaft 3412 can include one or more bearings such as cutlass bearings 3452 for providing support to the second shaft 3112 and propeller 3420. The cutlass bearings 3452 can be coupled with one end of the supports 3445, 3444.

Figure 44:
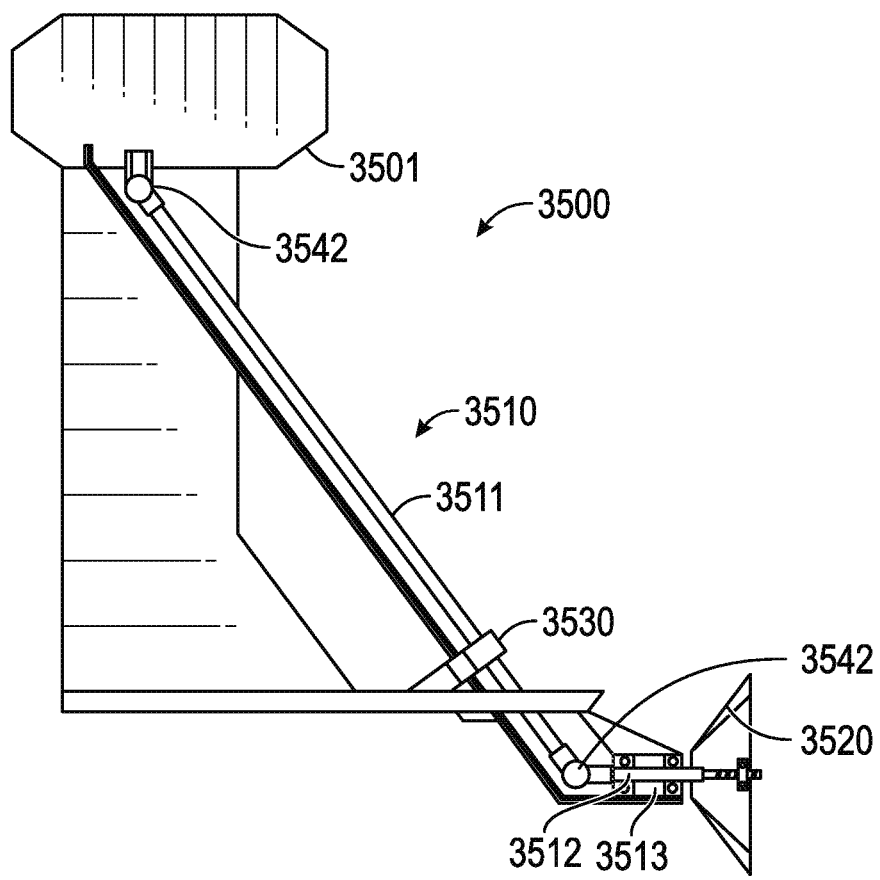
FIG. 44 shows a second outboard marine drive including a mechanical joint and a water pump.

FIG. 44 illustrates another embodiment of an outboard marine drive motor 3500. The marine drive 3500 can include an engine 3501 with a drive train 3510 with one or more mechanical joints 3540, 3542 connecting shafts 3511, 3512 and the output of a transmission of the engine 3501. A propeller 3520 can provide propulsion to a boat (not shown). A portion of the drive shafts can be coupled with an impeller 3530 for picking up water through a water line 3532 to provide cooling to the engine 3501. A mount 3513 can support the position of the drive shaft 3512. The mount 3513 can include a bearing for the shaft 3512.

Figure 45:
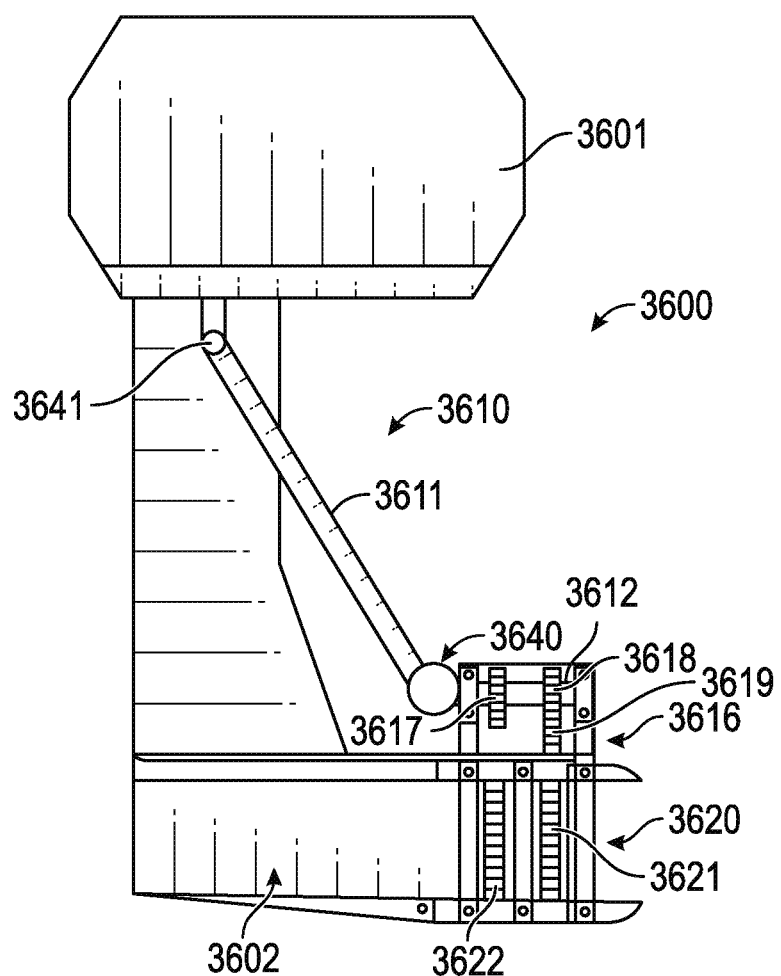
FIG. 45 shows a third outboard marine drive including a jet drive.

FIG. 45 illustrates another embodiment of an marine drive 3600. Drive 3600 can be an outboard type as shown, or implemented as a stern drive or inboard drive, or other implementation. Drive 3600 can include an engine 3601 and a drive train 3610 for powering a jet impeller 3620. A drive train 3610 can include one or more drive shafts 3611, 3612 and one or more mechanical joints 3640, 3641.

The drive 3600 can include a gear housing 3616 for transmitting torque to the impeller 3620. The gear housing 3616 can include one end of the drive shaft 3612 coupled with one or more gears 3617, 3618. The gears 3617, 3618 can mesh with rim-drive gears 3622, 3621, of the impeller 3620, respectively. The impeller 3620 can draw water through the jet impeller 3602 to provide propulsion to the boat.

The gear housing 3616 can include an a forward and reverse. The second gear 3618 can couple with a third gear 3619 that reverses direction to provide for opposite-direction driving of the impeller 3620. The drive shaft 3612 can shift engagement with the rim-drive gears 3622, 3621 to provide a forward and reverse for the drive 3600 (similar to a standard outboard type reverse mechanism).

Although specific embodiments have been described above, the above embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. An inboard marine drive system for a boat having a hull comprising:
   an inboard motor disposed within the hull;
   a transmission coupled with the inboard motor; and
   a drive shaft having a first end coupled with the transmission and a second end coupled with a propeller disposed outside of the hull;
   wherein the drive shaft comprises a first shaft segment and a second shaft segment, the first shaft segment coupled with the second shaft segment by a first joint for transferring rotational motion from the first shaft segment to the second shaft segment, the first joint comprising:
      a housing having a first end with a first concavity and a second end with a second concavity; and
      a first drive puck disposed within the first concavity and pivotable with respect to the housing about a first axis and a second drive puck disposed within the second concavity and pivotable with respect to the housing about a second axis, wherein the first and second drive pucks are cylindrical;
   wherein the first shaft segment is coupled with the first drive puck by a first pin and pivotable with respect to the first drive puck about a third axis, and the second shaft segment is coupled with the second drive puck by a second pin and pivotable with respect to the second drive puck about a fourth axis.

2. The inboard marine drive system of claim 1, wherein the first shaft segment is rotatable about a first rotation axis and the second shaft segment is rotatable about a second rotation axis, the first rotation axis disposed at a non-zero angle with the second rotation axis.

3. The inboard marine drive system of claim 2, wherein the non-zero angle is between 90° and 180°.

4. The inboard marine drive system of claim 2, wherein the second rotation axis is aligned with a direction of travel of the boat.

5. The inboard marine drive system of claim 1, wherein the housing comprises one or more apertures configured to draw water within the first and second concavities.

6. The inboard marine drive system of claim 1, wherein the propeller is disposed forward of a steerable rudder of the boat.

7. The inboard marine drive system of claim 1, further comprising:
   a steerable rudder of the boat coupled with the second shaft segment;

wherein adjusting a direction of the steerable rudder adjusts an angle between the first shaft segment and the second shaft segment.

8. The inboard marine drive system of claim 7, wherein the propeller is disposed aft of the steerable rudder of the boat.

9. The inboard marine drive system of claim 7, wherein the propeller is disposed forward of the steerable rudder of the boat and an end of the second shaft segment is coupled with the steerable rudder.

10. The inboard marine drive system of claim 1, wherein the inboard motor, the transmission and the drive shaft are arranged as a v-drive.

11. The inboard marine drive system of claim 1, wherein the inboard motor, the transmission and the drive shaft are arranged as a z-drive.

12. The inboard marine drive system of claim 1, further comprising:
a third shaft segment of the drive shaft;
wherein the third shaft segment is coupled with the second shaft segment by a second joint for transferring rotational motion from the second shaft segment to the third shaft segment, the second end of the drive shaft disposed on the third shaft segment.

13. The inboard marine drive system of claim 12, wherein the first shaft segment is rotatable about a first rotation axis, the second shaft segment is rotatable about a second rotation axis, and the third shaft segment is rotatable about a third rotation axis the first rotation axis disposed at a first non-zero angle with the second rotation axis and the second rotation axis disposed at a second non-zero angle with the third rotation axis.

14. The inboard marine drive system of claim 13, wherein the first rotation axis is substantially parallel with the third rotation axis.

15. The inboard marine drive system of claim 12, further comprising:
a control arm coupled with the third shaft segment for steering the propeller;
wherein the control arm is configured to adjust an orientation of the third shaft segment about the second joint.

16. The inboard marine drive system of claim 15, wherein the control arm is configured to adjust an orientation of the second shaft segment about the first joint.

17. The inboard marine drive system of claim 15, further comprising:
a movable linkage having a first end coupled with the hull and a second end coupled with a mount, the mount coupled with the third shaft segment;
wherein the movable linkage, the mount and the second shaft segment and third shaft segment form a parallel linkage configured to maintain the orientation of the third shaft segment within a horizontal plane.

18. An outboard marine drive system configured for mounting on a boat comprising:
an outboard motor coupled with a transmission; and
a drive shaft having a first end coupled with the transmission and a second end coupled with a propeller disposed outside of a hull;
wherein the drive shaft comprises a first shaft segment and a second shaft segment, the first shaft segment coupled with the second shaft segment by a joint for transferring rotational motion from the first shaft segment to the second shaft segment, the joint comprising:
a housing having a first end with a first concavity and a second end with a second concavity; and
a first drive puck disposed within the first concavity and pivotable with respect to the housing about a first axis and a second drive puck disposed within the second concavity and pivotable with respect to the housing about a second axis, wherein the first and second drive pucks are cylindrical;
wherein the first shaft segment is coupled with the first drive puck by a first pin and pivotable with respect to the first drive puck about a third axis, and the second shaft segment is coupled with the second drive puck by a second pin and pivotable with respect to the second drive puck about a fourth axis.

19. The outboard marine drive system of claim 18, wherein the first shaft segment is rotatable about a first rotation axis and the second shaft segment is rotatable about a second rotation axis, the first rotation axis disposed at a non-zero angle with the second rotation axis.

20. The outboard marine drive system of claim 19, wherein the second rotation axis is oriented along a direction of travel of the boat and the second shaft segment includes the second end of the drive shaft having the propeller.

21. The outboard marine drive system of claim 18, wherein the second end of the housing comprises a thrust bearing coupled with the second shaft segment.

22. The outboard marine drive system of claim 18, further comprising an impeller-driven water line coupled with the drive shaft for cooling the outboard motor.

23. The outboard marine drive system of claim 18, further comprising a rim-drive propeller assembly.

24. The outboard marine drive system of claim 23, wherein the rim-drive propeller assembly includes a gear housing including one or more gears configured to couple the second shaft segment with a rim drive propeller.

* * * * *